United States Patent
He et al.

(10) Patent No.: US 12,455,895 B2
(45) Date of Patent: Oct. 28, 2025

(54) ARTIFICIAL INTELLIGENCE MODEL SURVEILLANCE SYSTEM

(71) Applicant: CoreLogic Solutions, LLC, Irvine, CA (US)

(72) Inventors: Bin He, Philadelphia, PA (US); Wei Geng, San Diego, CA (US); Jon Arthur Wierks, Tustin, CA (US); Kien Trong Trinh, San Diego, CA (US); Mark A. Spieckerman, Dana Point, CA (US); Sankar Bokka, Oxford, MS (US); Bryan Byron Craver, San Diego, CA (US); Roderick Maclan, San Diego, CA (US); Tricia J. Murray, San Diego, CA (US)

(73) Assignee: CoreLogic Solutions, LLC, Irvine, CA (US)

( * ) Notice: Subject to any disclaimer, the term of this patent is extended or adjusted under 35 U.S.C. 154(b) by 0 days.

(21) Appl. No.: 18/484,323

(22) Filed: Oct. 10, 2023

(65) Prior Publication Data

US 2024/0037116 A1    Feb. 1, 2024

Related U.S. Application Data

(63) Continuation of application No. 16/912,441, filed on Jun. 25, 2020, now Pat. No. 11,816,122.

(51) Int. Cl.
*G06F 16/00* (2019.01)
*G06F 16/21* (2019.01)
(Continued)

(52) U.S. Cl.
CPC .......... *G06F 16/256* (2019.01); *G06F 16/217* (2019.01); *G06N 20/20* (2019.01); *G06Q 50/16* (2013.01)

(58) Field of Classification Search
CPC ...... G06F 16/256; G06F 16/217; G06F 16/00; G06N 20/20; G06Q 50/16
See application file for complete search history.

(56) References Cited

U.S. PATENT DOCUMENTS 3,174,851 A   3/1965  Buehler et al.
4,770,725 A   9/1988  Simpson et al.
(Continued)

OTHER PUBLICATIONS

"Privacy-preserving Machine Learning through Data Obfuscation" by Zhang et al. (Year: 2018).

(Continued)

*Primary Examiner* — Michelle N Owyang
(74) *Attorney, Agent, or Firm* — Knobbe Martens Olson & Bear LLP

(57) ABSTRACT

Systems and methods for property valuation using automated valuation models are described herein, which involve a complex series of workflows for data processing, automated valuation modeling, and error detection—each of which are capable of leveraging machine learning algorithms/techniques and can be combined and operated together in a specific manner in order to improve data availability and data quality, improve the accuracy of generated property value estimates, improve the performance of the models over time, and allow the property value estimation to be adapted to various use cases. Estimation of property value may involve an ensemble model which reconciles the outputs of different sub-models based on a use case, with the sub-models using different approaches that have their own strengths and weaknesses.

16 Claims, 17 Drawing Sheets

(51) Int. Cl.
*G06F 16/25* (2019.01)
*G06N 20/20* (2019.01)
*G06Q 50/16* (2012.01)

(56) References Cited

U.S. PATENT DOCUMENTS

| | | | |
|---|---|---|---|
| 4,870,576 A | 9/1989 | Tornetta | |
| 4,918,526 A | 4/1990 | Lewis et al. | |
| 5,032,989 A | 7/1991 | Tornetta | |
| 5,193,056 A | 3/1993 | Boes | |
| 5,361,201 A | 11/1994 | Jost et al. | |
| 5,414,621 A | 5/1995 | Hough | |
| 5,680,305 A | 10/1997 | Apgar, IV | |
| 5,754,850 A | 5/1998 | Janssen | |
| 5,794,216 A | 8/1998 | Brown | |
| 5,830,179 A | 11/1998 | Mikus et al. | |
| 5,852,810 A | 12/1998 | Sotiroff et al. | |
| 5,857,174 A | 1/1999 | Dugan | |
| 5,867,155 A | 2/1999 | Williams | |
| 5,928,217 A | 7/1999 | Mikus et al. | |
| 6,014,664 A | 1/2000 | Fagin et al. | |
| 6,115,694 A | 9/2000 | Cheetham et al. | |
| 6,141,648 A | 10/2000 | Bonissone et al. | |
| 6,174,305 B1 | 1/2001 | Mikus et al. | |
| 6,178,406 B1 | 1/2001 | Cheetham et al. | |
| 6,312,455 B2 | 11/2001 | Duerig et al. | |
| 6,323,885 B1 | 11/2001 | Wiese | |
| 6,397,208 B1 | 5/2002 | Lee | |
| 6,401,070 B1 | 6/2002 | McManus et al. | |
| 6,484,176 B1 | 11/2002 | Sealand et al. | |
| 6,505,176 B2 | 1/2003 | DeFrancesco et al. | |
| 6,587,841 B1 | 7/2003 | DeFrancesco et al. | |
| 6,609,109 B1 | 8/2003 | Bradley et al. | |
| 6,609,118 B1 | 8/2003 | Khedkar et al. | |
| 6,636,803 B1 | 10/2003 | Hartz, Jr. et al. | |
| 6,681,211 B1 | 1/2004 | Gatto | |
| 6,748,369 B2 | 6/2004 | Khedkar et al. | |
| 6,836,270 B2 | 12/2004 | Du | |
| 6,842,738 B1 | 1/2005 | Bradley et al. | |
| 6,873,972 B1 | 3/2005 | Marcial et al. | |
| 6,876,955 B1 | 4/2005 | Fleming et al. | |
| 7,043,501 B2 | 5/2006 | Schiller | |
| 7,054,741 B2 | 5/2006 | Harrison et al. | |
| 7,076,448 B1 | 7/2006 | Snyder | |
| 7,127,439 B2 | 10/2006 | Jannarone et al. | |
| 7,289,965 B1 | 10/2007 | Bradley et al. | |
| 7,295,987 B2 | 11/2007 | Graff | |
| 7,333,943 B1 | 2/2008 | Charuk et al. | |
| 7,402,173 B2 | 7/2008 | Scheuermann et al. | |
| 7,587,348 B2 | 9/2009 | Liao et al. | |
| 7,711,574 B1 | 5/2010 | Bradley et al. | |
| 7,729,965 B1 | 6/2010 | An et al. | |
| 7,801,739 B2 | 9/2010 | Smith | |
| 7,835,919 B1 | 11/2010 | Bradley et al. | |
| 7,836,057 B1 | 11/2010 | Micaelian et al. | |
| 7,930,254 B1 | 4/2011 | Harral et al. | |
| 7,966,256 B2 | 6/2011 | Liao et al. | |
| 7,974,854 B1 | 7/2011 | Bradley et al. | |
| 8,001,024 B2 | 8/2011 | Graboske et al. | |
| 8,010,377 B1 | 8/2011 | Bradley et al. | |
| 8,140,421 B1 | 3/2012 | Humphries et al. | |
| 8,244,563 B2 | 8/2012 | Coon et al. | |
| 8,370,239 B2 | 2/2013 | Graboske et al. | |
| 8,396,812 B2 | 3/2013 | Hardman et al. | |
| 8,489,499 B2 | 7/2013 | Yan et al. | |
| 10,380,653 B1 | 8/2019 | Flint et al. | |
| 10,909,643 B1 | 2/2021 | Weiss | |
| 11,816,122 B1 | 11/2023 | He et al. | |
| 2001/0007953 A1 | 7/2001 | Evens | |
| 2001/0029477 A1 | 10/2001 | Freeman et al. | |
| 2001/0039506 A1 | 11/2001 | Robbins | |
| 2001/0047327 A1 | 11/2001 | Courtney | |
| 2002/0007336 A1 | 1/2002 | Robbins | |
| 2002/0035535 A1 | 3/2002 | Brock, Sr. | |
| 2002/0049653 A1 | 4/2002 | Johnson et al. | |
| 2002/0052766 A1 | 5/2002 | Dingman et al. | |
| 2002/0082681 A1 | 6/2002 | Boylan et al. | |
| 2002/0087389 A1 | 7/2002 | Sklarz et al. | |
| 2002/0099650 A1 | 7/2002 | Cole | |
| 2002/0103669 A1 | 8/2002 | Sullivan, Sr. et al. | |
| 2002/0127529 A1 | 9/2002 | Erdahl | |
| 2002/0133371 A1 | 9/2002 | Cole | |
| 2002/0147613 A1 | 10/2002 | Kennard et al. | |
| 2003/0011599 A1 | 1/2003 | Du | |
| 2003/0036995 A1 | 2/2003 | Lazerson | |
| 2003/0036996 A1 | 2/2003 | Lazerson | |
| 2003/0046099 A1 | 3/2003 | Lamont et al. | |
| 2003/0093366 A1 | 5/2003 | Halper et al. | |
| 2003/0126071 A1 | 7/2003 | Keyes et al. | |
| 2003/0144948 A1 | 7/2003 | Cleary et al. | |
| 2003/0149658 A1 | 8/2003 | Rossbach et al. | |
| 2003/0149659 A1 | 8/2003 | Danaher et al. | |
| 2003/0191723 A1 | 10/2003 | Foretich et al. | |
| 2003/0212565 A1 | 11/2003 | Badali et al. | |
| 2003/0212678 A1 | 11/2003 | Bloom et al. | |
| 2003/0236676 A1 | 12/2003 | Graham | |
| 2004/0019517 A1 | 1/2004 | Sennott | |
| 2004/0021584 A1 | 2/2004 | Hartz, Jr. et al. | |
| 2004/0039581 A1 | 2/2004 | Wheeler | |
| 2004/0049440 A1 | 3/2004 | Shinoda et al. | |
| 2004/0078464 A1 | 4/2004 | Rajan et al. | |
| 2004/0128232 A1 | 7/2004 | Descloux | |
| 2004/0133439 A1 | 7/2004 | Noetzold et al. | |
| 2004/0133493 A1 | 7/2004 | Ford et al. | |
| 2004/0153330 A1 | 8/2004 | Miller et al. | |
| 2004/0172127 A1 | 9/2004 | Kantor | |
| 2004/0243450 A1 | 12/2004 | Bernard, Jr. et al. | |
| 2004/0249447 A1 | 12/2004 | Boylan et al. | |
| 2004/0254803 A1 | 12/2004 | Myr | |
| 2005/0108025 A1 | 5/2005 | Cagan | |
| 2005/0154657 A1 | 7/2005 | Kim et al. | |
| 2005/0171822 A1 | 8/2005 | Cagan | |
| 2005/0192999 A1 | 9/2005 | Cook et al. | |
| 2005/0216292 A1 | 9/2005 | Ashlock | |
| 2005/0288942 A1 | 12/2005 | Graboske et al. | |
| 2006/0015357 A1 | 1/2006 | Cagan | |
| 2006/0026136 A1 | 2/2006 | Drucker et al. | |
| 2006/0059073 A1 | 3/2006 | Walzak | |
| 2006/0064415 A1 | 3/2006 | Guyon et al. | |
| 2006/0085207 A1 | 4/2006 | Carey et al. | |
| 2006/0085234 A1 | 4/2006 | Cagan | |
| 2006/0105342 A1 | 5/2006 | Villena et al. | |
| 2006/0116952 A1 | 6/2006 | Orfano | |
| 2006/0122918 A1 | 6/2006 | Graboske et al. | |
| 2006/0200492 A1 | 9/2006 | Villena et al. | |
| 2006/0218003 A1 | 9/2006 | Snyder | |
| 2006/0218005 A1 | 9/2006 | Villena et al. | |
| 2006/0271472 A1 | 11/2006 | Cagan | |
| 2007/0033122 A1 | 2/2007 | Cagan | |
| 2007/0033126 A1 | 2/2007 | Cagan et al. | |
| 2007/0192188 A1 | 8/2007 | Gregerson | |
| 2007/0226129 A1 | 9/2007 | Liao et al. | |
| 2008/0004893 A1 | 1/2008 | Graboske | |
| 2008/0097767 A1 | 4/2008 | Milman et al. | |
| 2008/0235153 A1 | 9/2008 | Tombs et al. | |
| 2008/0301064 A1 | 12/2008 | Burns | |
| 2009/0088967 A1 | 4/2009 | Lerner et al. | |
| 2009/0132263 A1 | 5/2009 | Costello | |
| 2009/0281972 A1* | 11/2009 | Shahani | G06N 20/00 706/14 |
| 2010/0057524 A1 | 3/2010 | Milman et al. | |
| 2010/0076881 A1 | 3/2010 | O'Grady et al. | |
| 2010/0088242 A1 | 4/2010 | Cagan | |
| 2011/0106743 A1 | 5/2011 | Duchon | |
| 2011/0196762 A1 | 8/2011 | Dupont | |
| 2012/0005112 A1 | 1/2012 | Woodworth et al. | |
| 2012/0158459 A1 | 6/2012 | Villena et al. | |
| 2012/0215703 A1 | 8/2012 | Yao et al. | |
| 2012/0278243 A1 | 11/2012 | Frazier et al. | |
| 2012/0303536 A1 | 11/2012 | Wierks et al. | |
| 2013/0144796 A1 | 6/2013 | Fout et al. | |
| 2013/0282596 A1 | 10/2013 | Fleming | |
| 2014/0351019 A1 | 11/2014 | Whitney et al. | |
| 2015/0012335 A1 | 1/2015 | Xie et al. | |

(56) References Cited

U.S. PATENT DOCUMENTS

| | | |
|---|---|---|
| 2018/0225593 A1 | 8/2018 | Cozine et al. |
| 2019/0244139 A1 | 8/2019 | Varadarajan et al. |
| 2019/0295196 A1 | 9/2019 | Fleming |
| 2019/0377984 A1* | 12/2019 | Ghanta ............... G06F 18/2155 |
| 2020/0097389 A1* | 3/2020 | Smith ................ G06F 11/0793 |
| 2020/0201727 A1* | 6/2020 | Nie ........................ G06N 20/00 |
| 2020/0294162 A1 | 9/2020 | Shah |
| 2021/0125271 A1 | 4/2021 | O'Moore et al. |

OTHER PUBLICATIONS

"Public Views of Artificial Intelligence and Intellectual Property Policy" (Year: 2020).
https://blogs.nvidia.com/blog/2016/08/22/difference-deep-learning-training-inference-ai/ (Year: 2016).

* cited by examiner

ARTIFICIAL INTELLIGENCE MODEL SURVEILLANCE SYSTEM

CROSS-REFERENCE TO RELATED APPLICATIONS

This application is a continuation of U.S. patent application Ser. No. 16/912,441, entitled "MULTI-USE ARTIFICIAL INTELLIGENCE-BASED ENSEMBLE MODEL" and filed on Jun. 25, 2020, which is hereby incorporated herein by reference in its entirety.

FIELD OF THE DISCLOSURE

The described technology generally relates to techniques and systems that train and use an artificial intelligence-based ensemble model applicable to a variety of use cases. More specifically, the disclosure relates to the use of data formatting and processing techniques on databases of existing properties and the application of complex machine learning and modeling to perform machine recognition of specific features and conditions in the data in order to calculate desired outputs.

BACKGROUND

Machine learning is a form of artificial intelligence that can be employed to analyze large quantities of data, determine relationships that exist in the data, and apply those relationships to out-of-sample data in a predictive capacity. For example, automated valuation models can use machine learning techniques and computer decision logic in order to analyze public record data and provide a calculated estimate of a property's value at a specific time (typically by analyzing the values of comparable properties). This allows an estimated valuation to be generated in a matter of seconds, which is very helpful in many circumstances.

However, existing automated valuation models have various limitations. For example, these models often do not take into account the property condition as there is no physical inspection of the property, which results in the generation of a valuation that assumes an average condition which may not reflect reality. These models also typically rely on most-recent transactional data (e.g., a historical instance in time), which may not provide a complete picture because it does not account for changes in value over time, current market conditions, timing differences (e.g., for the transactions of comparable properties), and so forth. This can affect the accuracy of the valuations produced by the models, which is heavily dependent on available data and data quality.

SUMMARY OF THE DISCLOSURE

Described herein are systems and methods for property valuation that implement a complex series of machine learning-based workflows for data processing, property valuation, and error detection. These workflows work together in a specific manner to provide improved accuracy in property value estimates that can be adapted to particular use cases and will continuously improve in accuracy over time.

Public and private record data for properties may be collected from various data sources. Rules and machine learning algorithms can be used to accurately predict the quality and condition of a properties and organize the historical values of each property into chronological order. The quality and condition data and property value history data can be used to supplement the available property data in order to build comprehensive data profiles for each property. This data can be further enriched, filtered, and processed in order to improve data quality, such as by removing duplicate or erroneous data.

In order to value a subject property for a specific use case, multiple sub-models may be used to each generate an estimate of property value, with the sub-models employing different approaches that have their own strengths and weaknesses. Some of these sub-models may leverage machine learning models for modeling different relationships that exist among the large quantities of data within the system. In some cases, machine learning models specific to the subject property may be trained on the fly and applied back to the subject property to estimate its value.

An ensemble model may reconcile the outputs of the sub-models into a single property value estimate based on the selected use case. For example, the outputs could be combined in a weighted manner with the weights determined based on the use case. Thus, the output of a sub-model that utilizes an approach poorly-tailored to the selected use case may be down-weighted and have little impact on the final property value estimate.

As the property valuation workflow is performed over time, a model surveillance system may be used to constantly monitor the data to detect any anomalies/outliers and to constantly monitor individual model performance. The model surveillance system may learn and improve over time at spotting anomalies and understanding their causes, which allows the model surveillance system to provide valuable insights into correcting the anomalies or improving model performance. The model surveillance system may be able to automatically correct anomalies or improve models, which creates a continuous feedback loop to ensure that all aspects of the property valuation workflow are improved over time.

Various aspects of the novel systems and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to any systems and/or devices that could benefit from universal facial expression. The detailed description and drawings are merely illustrative of the disclosure rather than limiting, the scope of the disclosure being defined by the appended claims and equivalents thereof.

In various embodiments, a computer-implemented method is contemplated, with the method comprising steps of obtaining input data associated with a subject property; enriching the input data; preparing the input data for use with a plurality of sub-models, wherein the plurality of sub-models are configured to generate a corresponding plurality of sub-model outputs, and wherein the plurality of sub-model outputs comprise estimations of the subject property value generated using different approaches; applying the plurality of sub-models to the input data to generate the plurality of sub-model outputs; determining a predicted error for each of the plurality of sub-model outputs; and applying an ensemble model to the plurality of sub-model outputs and the predicted error for each of the plurality of sub-model outputs, wherein the ensemble model is configured to combine the plurality of sub-model outputs into a final estimate of subject property value based on a use case.

In some embodiments, the use case is selected by a user. In some embodiments, the ensemble model uses a plurality of weights to combine the plurality of sub-model outputs into a final estimate, and wherein the plurality of weights is determined based on the use case. In some embodiments, a sub-model of the plurality of sub-models comprises a county level subject-neighbors sub-model. In some embodiments, a sub-model of the plurality of sub-models comprises an appraisal adjustment regression sub-model. In some embodiments, a sub-model of the plurality of sub-models comprises an appraisal emulation sub-model. In some embodiments, a sub-model of the plurality of sub-models comprises a property level machine learning sub-model. In some embodiments, the input data comprises a property value history for the subject property, and the method may further include the step of generating the property value history for the subject property based on a property value history model. In some embodiments, the input data comprises a quality and condition score for the subject history, and the method may further include the step of generating the quality and condition score for the subject property based on a quality and condition model. In some embodiments, the input data comprises a quality and condition score for the subject history, and the method may further include the step of generating the quality and condition score for the subject property based on a quality and condition model. In some embodiments, enriching the input data comprises removing duplicate transactions associated with the subject property.

In various embodiments, a system is contemplated, with the system comprising one or more computers and computer storage media storing instructions. The instructions, when executed by the one or more computers, may cause the one or more computers to perform operations comprising: obtaining input data associated with a subject property; enriching the input data; preparing the input data for use with a plurality of sub-models, wherein the plurality of sub-models are configured to generate a corresponding plurality of sub-model outputs, and wherein the plurality of sub-model outputs comprise estimations of the subject property value generated using different approaches; applying the plurality of sub-models to the input data to generate the plurality of sub-model outputs; determining a predicted error for each of the plurality of sub-model outputs; and applying an ensemble model to the plurality of sub-model outputs and the predicted error for each of the plurality of sub-model outputs, wherein the ensemble model is configured to combine the plurality of sub-model outputs into a final estimate of subject property value based on a use case.

In some embodiments, the use case is selected by a user. In some embodiments, the ensemble model uses a plurality of weights to combine the plurality of sub-model outputs into a final estimate, and wherein the plurality of weights is determined based on the use case. In some embodiments, a sub-model of the plurality of sub-models comprises a county level subject-neighbors sub-model. In some embodiments, a sub-model of the plurality of sub-models comprises an appraisal adjustment regression sub-model. In some embodiments, a sub-model of the plurality of sub-models comprises an appraisal emulation sub-model. In some embodiments, a sub-model of the plurality of sub-models comprises a property level machine learning sub-model.

In various embodiments, non-transitory computer storage media is contemplated, with the non-transitory computer storage media storing instructions that when executed by a system of one or more computers, cause the one or more computers to perform operations comprising: obtaining input data associated with a subject property; enriching the input data; preparing the input data for use with a plurality of sub-models, wherein the plurality of sub-models are configured to generate a corresponding plurality of sub-model outputs, and wherein the plurality of sub-model outputs comprise estimations of the subject property value generated using different approaches; applying the plurality of sub-models to the input data to generate the plurality of sub-model outputs; determining a predicted error for each of the plurality of sub-model outputs; and applying an ensemble model to the plurality of sub-model outputs and the predicted error for each of the plurality of sub-model outputs, wherein the ensemble model is configured to combine the plurality of sub-model outputs into a final estimate of subject property value based on a use case.

In some embodiments, the predicted errors for the plurality of sub-model outputs are determined based on a plurality of error models associated with the plurality of sub-models, and wherein the plurality of error models are used by a model surveillance system configured to monitor performance of the plurality of sub-models and the ensemble model.

BRIEF DESCRIPTION OF THE DRAWINGS

The following drawings and the associated description herein are provided to illustrate specific embodiments of the disclosure and are not intended to be limiting.

DETAILED DESCRIPTION

Figure 1A:
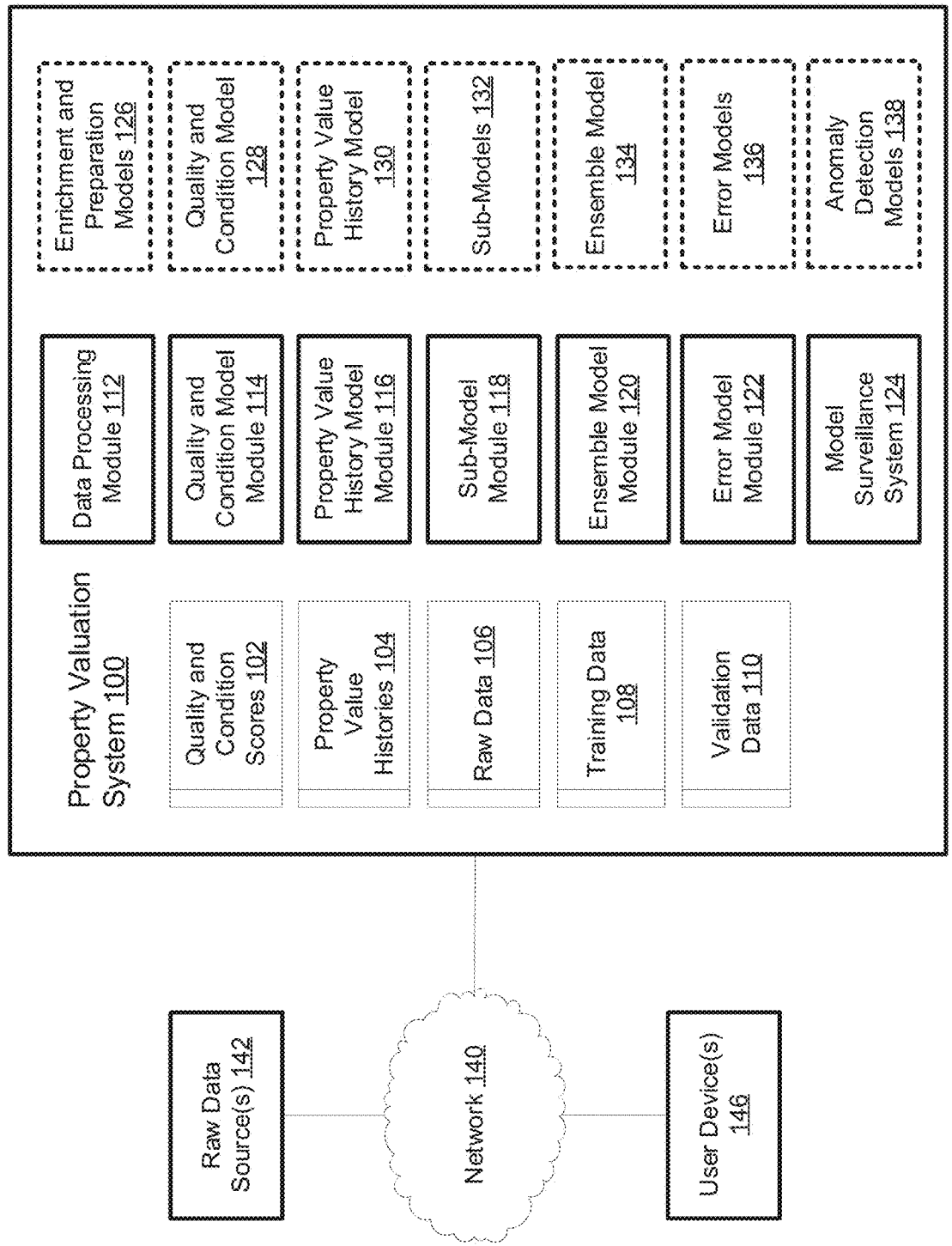
FIG. 1A is a block diagram that illustrates a property valuation system, in accordance with embodiments of the present disclosure.

As explained above, automated valuation models can use machine learning techniques and computer decision logic in order to analyze public record data and provide a calculated estimate of a property's value at a specific time (typically by analyzing the values of comparable properties). This allows an estimated valuation to be generated in a matter of seconds, which is very helpful in many circumstances.

However, existing automated valuation models have various technical limitations. For example, these models often do not take into account the property condition as there is no physical inspection of the property, which results in the generation of a valuation that assumes an average condition which may not reflect reality. These models also typically rely on most-recent transactional data (e.g., a historical instance in time), which may not provide a complete picture because it does not account for changes in value over time, current market conditions, timing differences (e.g., for the transactions of comparable properties), and so forth. This can affect the accuracy of the valuations produced by the models, which is heavily dependent on available data and data quality.

Furthermore, these models have different strengths and weaknesses based on the specific approach used, so they are often designed for a singular purpose in mind and lack flexibility. A model that is used by a group of users for one purpose may be found unsuitable for use by another group of users for another purpose. In order to satisfy all these user groups and purposes, many separate and different models may have to be designed and implemented. This may not be desirable because of the time, cost (e.g., computing resources, such as processing power, memory capacity, etc., used to train, re-train, and/or implement these models), and difficulty that would be associated with creating, implementing, and improving each of these models.

Accordingly, there exists a need for an approach to implementing automated valuation models for property valuation that can factor in property condition and value over time to improve available data and data quality and allow highly accurate estimations of property value to be generated, is flexible enough to be adapted to various use purposes, and reduces the time, cost, and difficulty associated with improving and maintaining the model over time. Embodiments of the present disclosure address these issues and more.

The present disclosure illustrates various systems and methods for automated property valuation that involve a complex series of workflows for data processing, automated valuation modeling, and error detection, which are capable of leveraging machine learning algorithms/techniques and work together in a specific manner in order to improve data availability and data quality, improve the accuracy of generated property value estimates, improve the performance of the models over time, and allow the property value estimation to be adapted to various use cases. The systems and methods described herein can provide more accurate estimates than existing automated valuation models while overcoming the various technical limitations of the existing automated valuation models described above.

In some embodiments, a property valuation system may include a property value history model, a quality and condition model, an ensemble model, a plurality of sub-models, a plurality of error models, and a plurality of anomaly detection models employed by a model surveillance system. The property valuation system may rely on these models throughout a property valuation workflow, which is performed in order to generate an estimated valuation for a subject property.

In some embodiments, the property valuation system may collect public and private record data for different properties from various data sources and supplement that data with property value histories and quality and condition scores generated using the property value history model and quality and condition model. The quality and condition model may include rules and machine learning algorithms that can be used to accurately predict a quality and condition score for a property, even if none currently exists. The property value history model may include rules and machine learning algorithms that can be used to generate a property value history for a property by organizing the historical values of the property into chronological order. Thus, the property valuation system may collect large quantities of data and supplement it in order to build up a comprehensive data profile for each property. In some embodiments, the property valuation system may perform data enrichment and preparation to further improve the data quality, such as by removing duplicate or erroneous data.

In some embodiments, the property valuation system may receive a request to generate an estimate of valuation for a subject property under a specific use case, such as a use case requiring maximum accuracy for the estimate. In some embodiments, the property valuation system may have multiple sub-models that may be used to each generate an estimate of property value, with the sub-models employing different approaches that have their own strengths and weaknesses. The property valuation system may collect data associated with the subject property and its potential comparables, format that data to be used with different sub-models, and provide that data as input data for the sub-models. In some embodiments, the sub-models may select what it considers to be the best comparables for the subject property. Some of these sub-models may leverage machine learning models for modeling different relationships in the data, such as relationships that exist between similar properties in a county, between the subject and its comparables, between the comparables, and so forth. In some embodiments, the sub-models may train and validate machine learning models specific to the subject property on-the-fly and apply it to the subject property in order to estimate its value.

In some embodiments, the property valuation system may employ an ensemble model to reconcile the outputs of the sub-models into a single property value estimate based on the selected use case. For example, the outputs could be combined in a weighted manner with the weights determined based on the use case. Thus, the output of a sub-model that utilizes an approach poorly-tailored to the selected use case may be down-weighted and have little impact on the final property value estimate.

In some embodiments, the property valuation system may include a model surveillance system. As the property valuation system repeatedly performs the property valuation workflow over time, the model surveillance system may constantly monitor the data at different points in the workflow to detect any anomalies/outliers. The model surveillance system may also constantly monitor the performance of individual models in the workflow. The model surveillance system may utilize a set of anomaly detection models to detect various anomalies or performance issues that may arise under different scenarios. In some embodiments, the model surveillance system may alert or inform of any anomalies or performance issues and can be taught what those anomalies or issues are. The model surveillance system may learn and improve over time at spotting anomalies and understanding their causes, which allows the model surveillance system to provide valuable insights into correcting the anomalies or improving model performance. In some embodiments, the model surveillance system may be able to automatically correct anomalies or improve models, which can simplify maintenance of the property valuation system and creates a continuous feedback loop to ensure that all aspects of the property valuation workflow are improved over time.

In order to facilitate an understanding of the systems and methods discussed herein, a number of terms are described below. The terms described below, as well as other terms used herein, should be construed broadly to include the provided definitions, the ordinary and customary meaning of the terms, and/or any other implied meaning for the respective terms.

As used herein in reference to user interactions with data displayed by a computing system, "user input" is a broad term that refers to any type of input provided by a user that is intended to be received and/or stored by the system, to cause an update to data that is displayed by the system, and/or to cause an update to the way that data is displayed by the system. Non-limiting examples of such user input include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse.

As used herein, a data store can refer to any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

As used herein, a database can refer to any data structure (and/or combinations of multiple data structures) for storing and/or organizing data, including, but not limited to, relational databases (e.g., Oracle databases, mySQL databases, and so on), non-relational databases (e.g., NoSQL databases, and so on), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Overview of a Property Valuation System

FIG. 1A is block diagram that illustrates a property valuation system.

The property valuation system 100 may be in communication with one or more raw data source(s) 142 and one or more user device(s) 146.

The raw data source(s) 142 may provide the property valuation system 100 with raw data 106 containing information about properties, such as their features, characteristics, values, and so forth. Examples of raw data source(s) 142 are provided in regards to FIG. 3. Some of this information will be useful for estimating the current valuations of the properties. In some embodiments, the property valuation system 100 may compile and store this raw data 106 in a datastore for faster accessibility and processing. In some embodiments, the property valuation system 100 may update this datastore by retrieving any new or missing raw data from the raw data source(s) 142 on a continuous or periodic basis.

The property valuation system 100 may include a quality and condition model module 114, which may be configured to train and/or apply the quality and condition model 128. The quality and condition model module 114 may apply the quality and condition model 128 to available information in the raw data 106 for a property in order to generate a quality and condition score for that property. This is discussed in further detail in regards to FIG. 5. In some embodiments, the quality and condition model module 114 may pre-process quality and condition scores 102 for all applicable properties contained in the raw data 106 and store the quality and condition scores 102 in a datastore for faster accessibility. In some embodiments, the quality and condition model module 114 may update the quality and condition scores 102 in the datastore when the quality and condition model 128 is updated, or on a continuous or periodic basis as new or missing raw data is received from the raw data source(s) 142.

The property valuation system 100 may include a property value history model module 116, which may be configured to train and/or apply the property value history model 130. The property value history model module 116 may apply the property value history model 130 to available information in the raw data 106 for a property in order to generate a property value history for the property. This is discussed in further detail in regards to FIG. 4. In some embodiments, the property value history model module 116 may pre-process property value histories 104 for all applicable properties contained in the raw data 106 and store the property value histories 104 in a datastore for faster accessibility. In some embodiments, the property value history model module 116 may update the property value histories 104 in the datastore when the property value history model 130 is updated, or on a continuous or periodic basis as new or missing raw data is received from the raw data source(s) 142.

The property valuation system 100 may include a data processing module 112, which may be configured to perform data enrichment and preparation on information provided in the raw data 106, the quality and condition scores 102, and the property value histories 104 based on the enrichment and preparation models 126. For example, the data processing module 112 may perform data enrichment and preparation to collect—for a subject property and its comparables—data from the raw data 106, the quality and condition scores 102, and the property value histories 104, and format all of that data as input data for the sub-models 132 and/or ensemble model 134. The data processing module 112 may also collect and generate data to be saved as training data 108 and/or validation data 110, which can be used to train and update the sub-models 132, ensemble model 134, error models 136, and so forth. For example, the data processing module 112 may generate a comprehensive data profile for each property and add it to the training data 108 and/or validation data 110. In addition, the data processing module 112 may be configured to train and/or apply the enrichment and preparation models 126 which are used in the data enrichment and preparation process, such as models for selecting comparables.

The property valuation system 100 may include a sub-model module 118, which may be configured to train and/or apply one or more sub-models 132. The sub-model module 118 may train and validate the various sub-models 132 based on available information in the training data 108 and validation data 110. The sub-model module 118 may apply the various sub-models 132 to make estimates of the value of a property using input data formatted by the data processing module 112. The outputs of these sub-models 132 may then be used as inputs in the ensemble model 134 to generate a final output (e.g., estimated property value).

The property valuation system 100 may include an ensemble model module 120, which may be configured to train and/or apply an ensemble model 134. The ensemble model 134 may be designed to produce a final output for an estimated property value based on the inputs provided by the sub-models 132 (e.g., the outputs of the sub-models 132) and a use case for the evaluation. In some embodiments, a user of the user device 146 may be able to request an evaluation from the property valuation system 100 and provide a selection of a particular property and use case, and the final output produced by applying the ensemble model 134 may be provided in the evaluation. The ensemble model module 120 may apply the ensemble model 134 to the outputs of the sub-models 132 based on the correct parameters dictated by the use case in order to generate a final estimated value for the property. The ensemble model module 120 may train and validate the ensemble model 134 based on any combination of data provided to it by the raw data 106, training data 108, validation data 110, and the outputs of the sub-models 132. During validation, the performance of the ensemble model 134 may be evaluated by applying the ensemble model 134 and generating a final estimated value for each property in the validation data 108, determining the error (e.g., the difference) between the final estimated value and the actual value (e.g., how much the property actually sold for) for each property in the validation data 108, and then using all those errors to calculate the absolute mean error.

The property valuation system 100 may include an error model module 122, which may be configured to train and/or apply error models 136. The error model module 122 may apply the error models 136 in order to predict error associated or confidence scores and forecast standard deviation associated with the output of any of the sub-models 132 and/or the ensemble model 134. In some embodiments, the error models 136 may include separate models for the sub-models 132 or ensemble model 134. The error model module 122 may train and validate the error models 136 for a particular sub-model or ensemble model based on the outputs of the sub-model or ensemble model (e.g., estimated property value) and the actual sale prices of the subject property associated with each output, which may be obtainable from among the raw data 106, the training data 108, and or validation data 110.

The property valuation system 100 may include a model surveillance system 124, which may be configured to train and/or apply anomaly detection models 138. The anomaly detection models may 138 be based on multiple different techniques which can be applied to the other models and model data (including model input data, model exhaust data, exhaust generated attributes, and complimentary data) in order to spot anomalies/outliers in the data and generate actionable insights (e.g., suggestions for adjusting, deleting, and/or adding model input data, model exhaust data, exhaust generated attributes, and/or complimentary data to resolve anomalies or outliers or to otherwise improve performance of the property valuation system 100 and/or the trained models) that can be used to update the models to enhance their performance. In some embodiments, the model surveillance system 124 may be able to make automatic adjustments to the other models to improve their performance or able to make automatic adjustments to data to correct any anomalies/outliers.

Figure 1B:
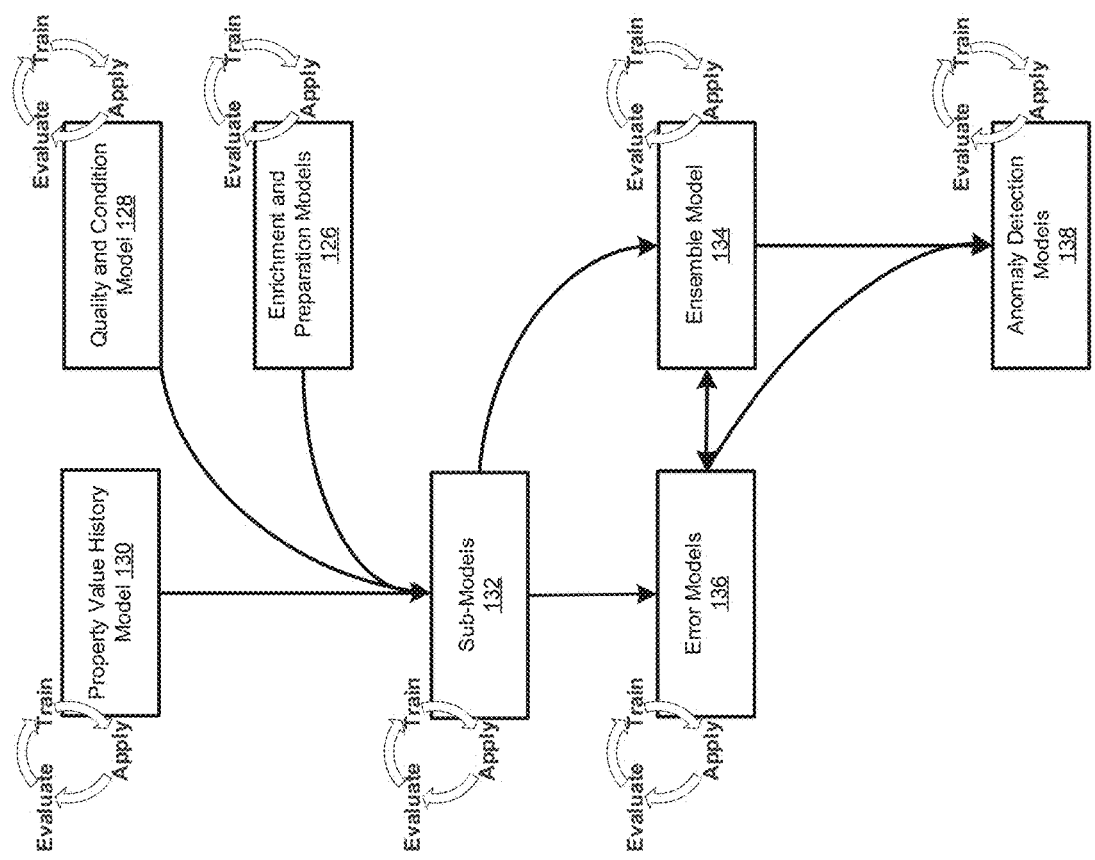
FIG. 1B is a block diagram that illustrates dependencies among the models used in an example property valuation system, in accordance with embodiments of the present disclosure.

FIG. 1B is a block diagram that illustrates dependencies among the models used in an example property valuation system, As can be seen, the property value history model 130, quality and condition model 128, and the enrichment and preparation models 126 all play in role in the generation of the input data used by the sub-models 132. In turn, the outputs of the sub-models 132 are used as inputs to the ensemble model 134 and also by the error models 136 in order to calculate error (e.g., confidence scores and forecast standard deviation) associated with each of the outputs of the sub-models 132. The outputs of the sub-models 132 and the errors produced by the error models 136 are used as inputs by the ensemble model 134 to generate a final prediction on property value. This output of the ensemble model 134 can also be used as an input by the error models 136 in order to calculate error (e.g., calculate confidence scores and forecast standard deviation) associated with the output of the ensemble model 134.

The model surveillance system 124 can apply the anomaly detection models 138 to constantly monitor the performance of all the preceding models and any data associated with those models in order to spot anomalies or outliers in the data or with the performance of any particular model and deliver actionable insights towards preventing those anomalies from being made. Those insights can then be used to evaluate, train, and update the model to correct for the anomalies and enhance the performance of the model. From the dependencies illustrated in the figure, it can be seen that this will have a cascading effect as the improved outputs from any of the models 126, 128, 130, 132, 134, and 136 will improve the performance of any downstream models. Similarly, the anomaly detection models 138 can also be evaluated, trained, and updated in order to better identify anomalies. In this manner, the property valuation system 100 and each of its models can be constantly and iteratively improved upon as the property valuation workflow is performed.

Overview of a Property Valuation Workflow.

Figure 2:
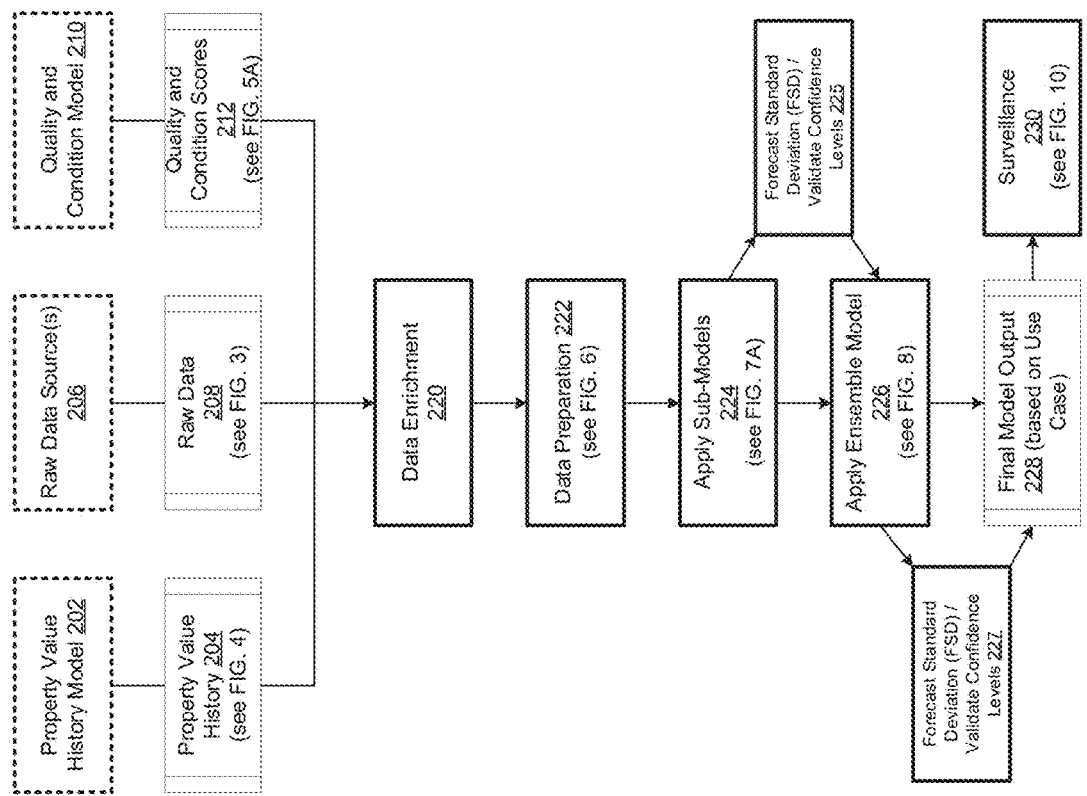
FIG. 2 is a flow diagram that illustrates a high level overview of the property valuation workflow performed by components of the property valuation system, in accordance with embodiments of the present disclosure.

FIG. 2 is a flow diagram that illustrates a high level overview of the property valuation workflow, which can be performed by components of the property valuation system.

The property valuation workflow illustrates what may happen when a user requests the valuation for a particular subject property. In some embodiments, the user may request a valuation for the subject property based on a specific use case, which can be selected by the user. This may affect the final model output 228 and estimated subject property value that is returned to the user.

At block 220, the property valuation system may collect and enrich data associated with the subject property (and in some embodiments, its potential comparables) which will be used in inputs to the subsequent sub-models and/or ensemble model of the workflow. Some examples of the data for a particular property that can be collected and enriched may include raw data 208 that is received from various raw data sources 206, a property value history 204 that can be generated by a property value history model 202, and quality and condition scores 212 that can be generated by a quality and condition model 210. Examples of the raw data 208 are provided and further described in regards to FIG. 3. The generation of the property value history 204 is further described in regards to FIG. 4. The generation of the quality and condition scores 212 is further described in regards to FIG. 5A.

The data enrichment process is used to create a unified, rich property description record using the data that has been obtained from multiple data sources. During the data enrichment process, the completeness of the data and the correctness of individual data items may be verified. Some data items may exist across multiple data sources. In such cases, the multiple versions of that data item may be reconciled to obtain a single version of the data item. In various embodiments, this reconciliation can be performed based on an algorithm or different sets of rules. In some embodiments, there may be a set of rules that are used to select the best data source for a data item, and that data source's version of the data item may be used over the versions of the data item provided by other data sources.

For example, sometimes data can be obtained from the county that a property is located in, which will contain information about a sale of the property (e.g., date, amount). That kind of information could also be obtained from appraisal data and MLS data as well, but the county data may be generally more reliable. So there could be a set of rules which establish that property sales data should be used from the most reliable source, and that county data is more reliable than appraisal data, which in turn is more reliable than MLS data.

At block 222, the property valuation system may perform further data preparation by selecting and filtering comparables to a property (e.g., other properties that are similar to the subject property based on their respective location, size, condition, and other features). In some embodiments, the comparables may be scored with a "comp score" and mark-to-market values may be calculated for the subject property and the comparables. In some embodiments, all of the relevant data for a subject property and its comparables (including the calculated mark-to-market values and comp score) may be collected and formatted to be used as input data for the sub-models. In some embodiments, the input data for each of the sub-models may vary between sub-models, and this data preparation step may collect the relevant data and compile it into the relevant format for each sub-model.

At block 224, the property valuation system may apply each of the sub-models to the corresponding input data provided to it. Examples of sub-models are further described in regards to FIGS. 7A-7E. The sub-models may be configured to separately generate an estimate of subject property value using different techniques. Thus, if there are four sub-models, four separate estimates of subject property value would be produced.

At block 225, error models may be applied to the sub-models in order to generate a predicted error associated with the outputs of the sub-models, which can be used to determine confidence levels and forecast standard deviation associated with the outputs of the sub-models. A separate error model may need to be trained and applied to each sub-model (which itself may actually be many different models, e.g., for each county). Error models are described in additional detail in regards to FIG. 9.

At block 226, the outputs of the sub-models (e.g., the estimates of subject property value), the error associated with those outputs, and any relevant data for the subject property can be provided as input data to an ensemble model. The ensemble model is described in further detail in regards to FIG. 8. The ensemble model may be applied to reconcile and combine the outputs of the sub-models in order to generate a final estimate of subject property value. In some embodiments, the technique or approach used by the ensemble model to arrive at the final estimate of subject property value may be based on the selected use case. Thus, the final model output 228 of the ensemble model would be based on the selected use case. For example, in some embodiments, there may be four sub-models generating four separate estimates of subject property value and the ensemble model may calculate a weighted average of the four estimates. If the selected use case requires maximizing the accuracy of the final estimate of subject property value, the ensemble model may iteratively determine the best weights to use for each of those four sub-models that would minimize the error associated with its final model output 228.

At block 227, an error model for the ensemble model may be applied to the ensemble model in order to generate a predicted error associated with final model output 228, which can be used to determine confidence levels and forecast standard deviation. The final model output 228 and its associated error can then be reported together (e.g., to a requesting user). In some embodiments, the final model output 228 and its associated error may be evaluate at block 230 in order to evaluate the performance of the ensemble model. This process may be performed by a model surveillance system and is described in more detail in regards to FIG. 10. Although not shown, as the illustrated property valuation workflow is performed, the data and models at any point in the workflow may be monitored by the model surveillance system in order to generate feedback that can be used to spot and correct any anomalies/outliers in the data or to improve the performance of any of the models.

Figure 3:
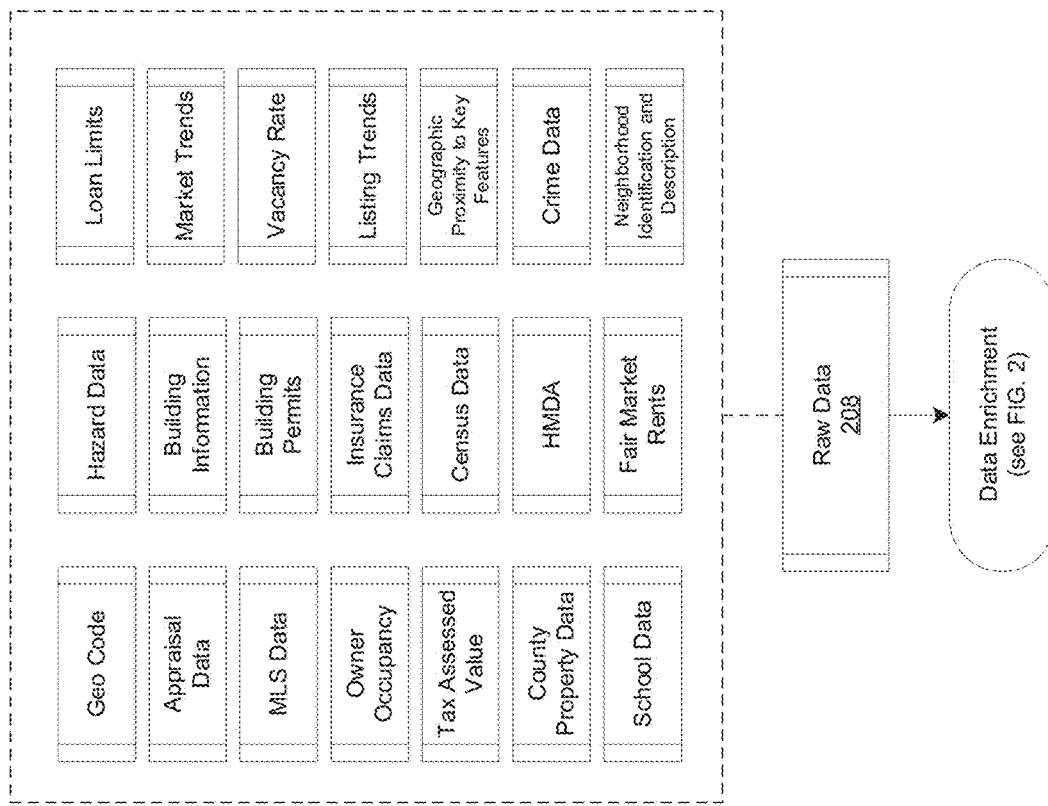
FIG. 3 is a block diagram that illustrates examples for the raw data 208 provided by the various raw data sources 206 of FIG. 2, in accordance with embodiments of the present disclosure.

FIG. 3 is a block diagram that illustrates examples for the raw data 208 provided by the various raw data sources 206 of FIG. 2 that can be collected, enriched, and used in the sub-models and/or ensemble model described herein. As a general matter, raw data 208 for a large quantity of properties can be collected, enriched, and used as training data in the generation and tuning of the sub-models and/or ensemble model described herein. The sub-models and/or ensemble model can be applied once they have been generated, and raw data 208 for one or more particular properties of interest can be collected, enriched, and used as inputs in the sub-models and/or ensemble model for predictive purposes. It should be noted that FIG. 3 and its accompanying description does not provide an exhaustive list of the kinds of raw data that can be used in the sub-models and/or ensemble model. Furthermore, different embodiments of the sub-models and/or the ensemble model may utilize varying combinations of different kinds of raw data.

In some embodiments, the received raw data 208 for a property may include its geo code, which may be a latitude/longitude location on the Earth's surface for that particular property.

In some embodiments, the received raw data 208 for a property may include appraisal data for the property, which may include appraisal reports that are generated and provided by an appraisal source after inspecting the property. Appraisal reports may provide an opinion of value (e.g., market value, use value, investment value, tax value, insurable value, liquidation value, and so forth) for the property and often form the basis for financial decisions made on the property (e.g., the issuing of mortgage loans, taxation, and so forth). Included in an appraisal report may be descriptions of the intended audience and intended use for the appraisal report, the definitions of values provided in the report, the hypothetical conditions or assumptions used in generating the report, the effective date of the appraisal analysis, features of the property that were material to the appraisal analysis, and so forth.

In some embodiments, the received raw data 208 for a property may include multiple listing service (MLS) data, which may include contractual offers of compensation or commission rates offered by the listing broker of the property and published to other brokers, as well as various kinds of property information that may be relevant to making appraisals.

In some embodiments, the received raw data 208 for a property may include the owner occupancy status associated with the property (e.g., "owner occupied" or "not owner occupied"). For example, if the property is a principal dwelling occupied by its owner, the property may be reported as owner occupied even if the owner is not the borrower or applicant. This information may commonly be obtained from public records (e.g., U.S Census Bureau data), government agencies, banks or mortgage lenders, and so forth.

In some embodiments, the received raw data 208 for a property may include tax assessed value, which may be a dollar value assigned to the property by a government tax assessor to measure applicable taxes (e.g., price placed on the property by a government municipality to calculate property taxes).

In some embodiments, the received raw data 208 for a property may include county property data. In some cases, county property data may include various kinds of property data collected by a county, including property assessment data, property records (e.g., the owner's name, street address, etc.), tax bill data, and so forth.

In some embodiments, the received raw data 208 for a property may include school data for neighboring public and private schools. In some cases, this data may be obtained from various government agencies. The data may include school details (e.g., the number of students, the student/teacher ratio, etc.) and enrollment characteristics (e.g., student demographics), and any school ratings and reports based on student performance and curriculum.

In some embodiments, the received raw data 208 for a property may include hazard data. In some cases, this data may be obtained from third-party property-level hazard risk databases. The data may include discrete information about potential hazards and risks that would impact the property value and the property's susceptibility to those kinds of risks (e.g., flood, hail, earthquake, wildfire, wind, lave flow, soil condition and liquefaction, etc.).

In some embodiments, the received raw data 208 for a property may include building information for the building(s) on the property. This data may include details about the building itself, such as the building materials used to construct the building, the structural characteristics of the building, and building costs (e.g., costs of building materials and construction), etc.

In some embodiments, the received raw data 208 for a property may include detailed information for building permits associated with the property, including value, location, past work description, etc.

In some embodiments, the received raw data 208 for a property may include insurance claims data and/or policy-in-force data. In some cases, this data may be obtained from property insurance companies. The data may include details about the insurance policy on the property, which may include information about the property (e.g., location, square footage, etc.) and the costs, terms, and conditions associated with an insurance policy on the property (e.g., what is covered, policy limits, etc.), and details associated with insurance claims brought by the property owner, such as damage estimates, payout, etc.

In some embodiments, the received raw data 208 for a property may include census data obtained from censuses, surveys, and programs. In some data, this data may be obtained from various government agencies. This data may include details about the property (e.g., size, age, type), characteristics associated with the owner or tenant of the property, details about maintenance, management practices, tenant policy, financial aspects of rental property ownership, and so forth.

In some embodiments, the received raw data 208 for a property may include Home Mortgage Disclosure Act (HMDA) data. This data may be maintained and disclosed by financial institutions in accordance with the HMDA. This data may provide information about lending activity associated with the property, including loan-level information about mortgages such as number and dollar amounts of lending, characteristics of the loan applicant, geographic characteristics of the property, and so forth.

In some embodiments, the received raw data 208 for a property may include fair market rent data. The fair market rent associated with a property may be a calculated amount of money that would be needed to pay the gross rent (shelter rent plus utilities) of privately owned, decent, and safe rental housing of a modest (non-luxury) nature with suitable amenities in the geographical location of the property (e.g., within the same ZIP code), set at the 40th percentile of the distribution of gross rents.

In some embodiments, the received raw data 208 for a property may include loan limit data. The Federal Housing Finance Agency (FHFA) publishes annual conforming loan limits that apply to all conventional mortgages, which include general loan limits and high-cost area loan limits that vary by geographic location. The loan limit data associated with a particular property may be the maximum conforming loan limits given the particular property's type and geographic location.

In some embodiments, the received raw data 208 for a property may include market trends and market data. This data may illuminate the various kinds of market trends in the market segment associated with the property (e.g., based on the property's type and geographic location), such as trends in average sale price, price per square foot, and so forth.

In some embodiments, the received raw data 208 for a property may include vacancy rate data. This data may provide, for the geographical location of the property, the vacancy or the percentage of all available units in a rental property, such as a hotel or apartment complex, that are vacant or unoccupied at a particular time.

In some embodiments, the received raw data 208 for a property may include listing trends from listing data. This data may illuminate the various kinds of listing trends in the market segment associated with the property (e.g., based on the property's type and geographic location), such as trends in the number of new listings over time.

In some embodiments, the received raw data 208 for a property may include geographic proximity data providing details about key features that are in geographic proximity to the property (e.g., beaches, coastlines, shorelines, bodies of water, golf courses, fire stations, mass transit, industrial parks, shopping centers, parks, recreational areas, railroads, nature preserves, Super Fund sites, landfills, flood control channels, reservoirs, airports, military bases, schools, colleges, universities, etc.), crime data and statistics associated with crime in the geographic location of the property, and/or neighborhood identification and description data providing details and characteristics of the neighborhood that the property is located in.

Figure 4:
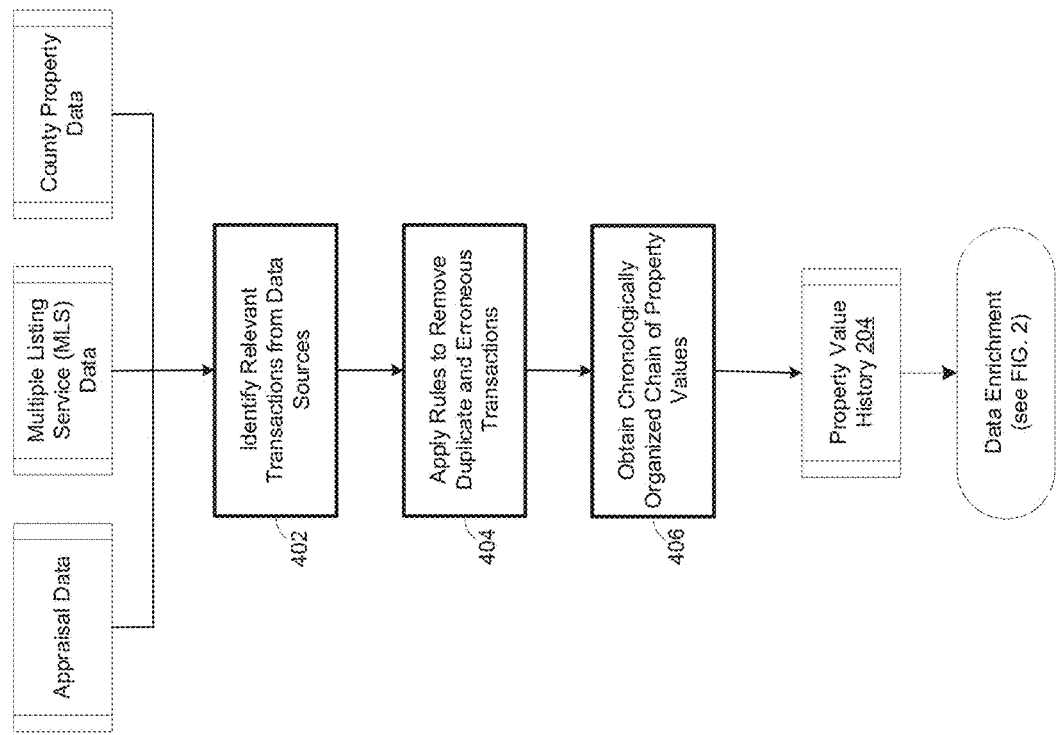
FIG. 4 is a flow chart that illustrates the basic workflow for generating property value history using a property value history model, in accordance with embodiments of the present disclosure.

FIG. 4 is a flow chart that illustrates the basic workflow for generating property value history using a property value history model. In some embodiments, the property value history model may be based on a set of rules and conditions. This property value history model may be applied for a specific property in order to generate a property value history for the property, which may comprise a rather comprehensive collection of the transaction values for the property over an extensive span of time (e.g., ten years or more). The data in the property value history can then be further used as an input in the sub-models and/or ensemble model described herein.

When generating the property value history for a particular property, the property value history model may have access to certain types of data associated with that property. This data may be obtainable from various data sources, and it may include appraisal data for the property (e.g., from appraisal reports that are generated and provided by an appraisal source after inspecting the property, which may provide an opinion of value for the property and details about how the report was generated), multiple listing service (MLS) data for the property (e.g., contractual offers of compensation or commission rates offered by the listing broker of the property and published to other brokers), and county property data for the property (e.g., various kinds of property data collected by the county that the property is located in, including property assessment data, property records, tax bill data, etc.).

At block 402, the property value history model may identify relevant transactions for the property from all this data obtained from the data source(s). For example, the property value history model may determine that certain transaction types should be considered relevant transactions for the property (e.g., certain kinds of appraisals, listings of the property, sales of the property are relevant). The property value history model may also determine that, within a specific transaction type, only some of the transactions of that transaction type are relevant (e.g., ignore sales of the property that had 'X' condition). In some embodiments, the property value history model may be able to change the criteria for determining relevant transactions based on the property and its associated characteristics.

At block 404, the property value history model may apply rules to remove duplicate transactions and erroneous transactions with bad data from the set of relevant transactions identified at block 402. For example, when obtaining data from multiple data sources, there may be duplicate data for the same transaction (e.g., MLS data and county property data could both contain records associated with a particular sale of the property). Depending on the rules applied, one set of data records for a duplicate transaction could be retained while discarding the others (e.g., keep the transaction records from the county property data because it is likely to be more accurate), data records for the transaction may be merged and de-duped to retain a more comprehensive profile of the transaction (e.g., combine MLS data records and county property data records associated with a particular sale of the property), and so forth. In some cases, there may be duplicate transactions from the same data source (e.g., data for the same transaction was manually entered twice) and those duplicates may be removed. In some cases, there may be erroneous transactions (e.g., someone entered the wrong amount for a transaction) in the data which the model can spot and remove. Removing duplicate and erroneous transactions from the set of relevant transactions identified at block 402 may leave the property value history model with a corrected set of relevant transactions.

At block 406, the property value history model may chronologically sort the corrected set of relevant transactions in order to obtain a chronologically-organized chain of property values at discrete times (e.g., assigned to the property by an appraiser, real estate agent, or the publicly recorded sale of the property, etc.) for the property. This chronologically-organized chain of property values is the property value history 204 that is output by the property value history model. In some embodiments, as illustrated in FIG. 2, this property value history 204 generated by the property value history model may be further processed and used as an additional input by the sub-models and/or ensemble model.

Figure 5A:
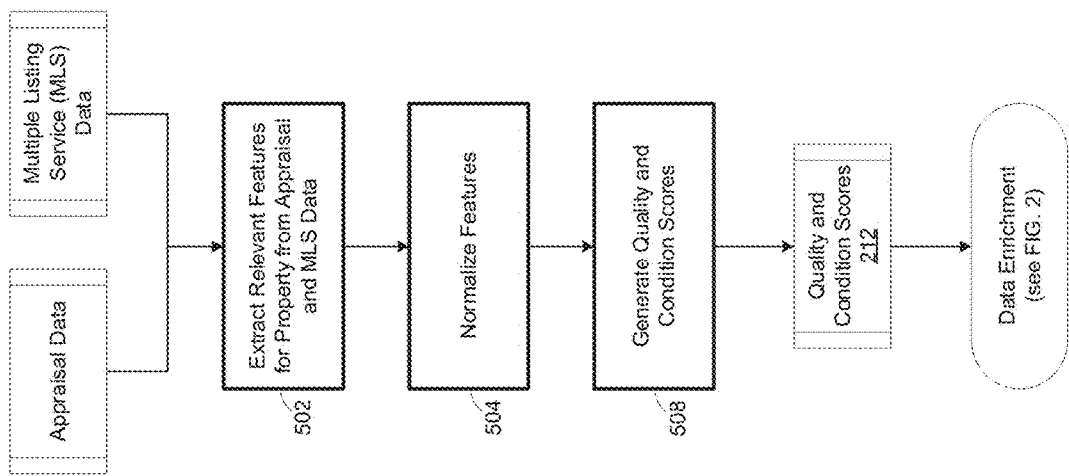
FIG. 5A is a flow chart that illustrates the basic workflow for generating quality (e.g., construction quality) and condition scores using a quality and condition model, in accordance with embodiments of the present disclosure.

FIG. 5A is a flow chart that illustrates the basic workflow for generating quality (e.g., construction quality) and condition scores using a quality and condition model. In some embodiments, the quality and condition model may be based on a set of one or more machine learning models that can evaluate text mined from data (e.g., MLS listing data) and images of the property (e.g., images of the property interior or exterior). The quality and condition model may be applied to data for a specific property in order to generate quality and condition scores for the property. Since the quality and condition of a property may affect its valuation, these quality and condition scores can be further used as an input in the sub-models and/or ensemble model described herein in order to better estimate property value.

When the quality and condition model is applied for a particular property, the quality and condition model may have access to certain types of data associated with that property. This data may be obtainable from various data sources, and it may include appraisal data for the property (e.g., from appraisal reports that are generated and provided by an appraisal source after inspecting the property, which may provide an opinion of value for the property and details about how the report was generated) and multiple listing service (MLS) data for the property (e.g., contractual offers of compensation or commission rates offered by the listing broker of the property and published to other brokers).

At block 502, the quality and condition model may extract the relevant features from the appraisal data and MLS data that are determinative in scoring the quality and condition of the property. For instance, the quality and condition model may be able to extract features from images of the property interior or exterior in the appraisal data (e.g., identifying the fixtures and their characteristics in the rooms of the property), from the text of the public remarks provided in the MLS data (e.g., by performing natural language processing on the submitted remarks and processing the results), and from the property descriptions and characteristics provided in both the appraisal and MLS data. In some embodiments, these features may be features that were automatically identified and selected during the training process because they were determined to be useful for scoring the quality and condition of the property. For instance, the text of the public remarks for a property may indicate that it is a newly remodeled home, and the model may be able to determine the home is newly remodeled from the public remarks and also understand that the quality and condition of a newly remodeled home is likely to be better, so it will factor in that knowledge into generating the quality and condition score.

In various embodiments, the features may include interval features such as the number of bathrooms, the number of full bathrooms, the number of half bathrooms, the number of bedrooms, the number of stories, the number of garage spaces, the number of fire places, and so forth. In some embodiments, the features may include numerical features such as the current value of improvements made to the property, the current value of the land, the number of square feet for the living area, the lot size, the price per square feet, the age of the property, and so forth. In some embodiments, the features may include categorical features, such as whether the property has a pool, the building style of the property, the type of land use (e.g., recreational, transport, agricultural, residential, commercial, etc.), and so forth. In some embodiments, the features may include text features, such as those extracted from descriptions of quality and condition in public remarks of a listing, and so forth. In some embodiments, the features may include visual features, such as those extracted from images of the interior or exterior of the property.

At block 504, the quality and condition model may normalize the features that were extracted at block 502, which may improve the performance of the quality and condition model in scoring the quality and condition of the property.

At block 506, the quality and condition model may use the normalized features as inputs and apply weights and biases determined from the training process to generate values that are predictive of the quality and condition of the property, which are the quality and condition scores 212. In some embodiments, as illustrated in FIG. 2, these quality and condition scores 212 generated by the quality and condition model may be enriched and used as an additional input by the sub-models and/or ensemble model.

Figure 5B:
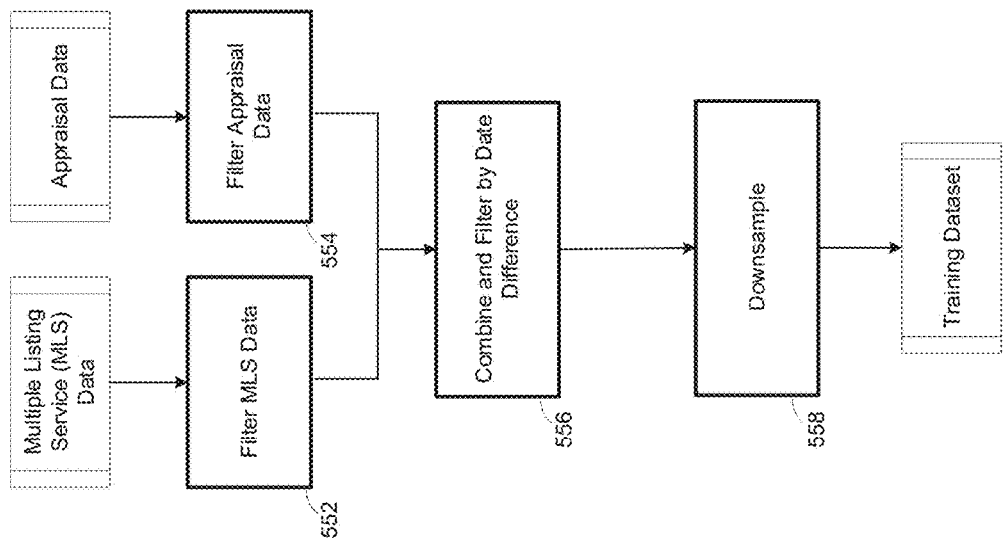
FIG. 5B is a flow chart that the basic workflow for preparing the training dataset used to train the quality and condition model, in accordance with embodiments of the present disclosure.

FIG. 5B is a flow chart that illustrates the basic workflow for preparing the training dataset used to train the quality and condition model.

Appraisal data and multiple listing service (MLS) data may contain condition and quality information. For instance, some appraisal reports may actually contain indications of the overall condition and quality for the property being appraised, and MLS data may contain public remarks about the condition and quality of a property. However, the issue is that condition and quality information is not always available and it may not be well-populated in the data. For instance, there may not be appraisal reports for every property and most properties may not have appraisal reports. Furthermore, even among existing appraisal reports, not all of them may provide ratings of the overall condition or quality. Similarly, only a fraction of properties may be listed in the MLS data and not all of them will have public remarks about condition and quality.

Accordingly, in order to train the quality and condition model to make estimates of quality and condition based on the contents of appraisal reports and MLS listings in the cases when actual condition and quality ratings are not provided, the appraisal data and MLS data must be processed into an appropriate training dataset restricted to properties for which the actual condition and quality ratings are known. Thus, at block 552, the system may filter the MLS data to obtain only the listings that are sold or closed and contain public remarks (e.g., public remarks: not null), since actual condition and quality ratings would be provided in the public remarks. At block 554, the system may also filter the appraisal data in order to filter out appraisals where the appraisal purpose is not APR or APO.

At block 556, the system may combine the filtered MLS data and filtered appraisal data for any property having both MLS listings and appraisals to obtain a combined dataset. The system may also filter out any cases in which the date difference between the MLS listings and appraisals for a property are too great (e.g., if the property has a MLS listing from 2 years ago and an appraisal from 20 years ago, too much may have changed since the appraisal for it to be relevant).

At block 558, the system may downsample the remaining dataset in order to obtain a balanced and proportionate number of properties in the different categories for quality and conditions. For instance, if the quality and condition of a property can be represented by a rating on a scale of 1-6, then there may be six different categories or buckets that the quality and condition of all the properties could fall into. Downsampling may help ensure that properties with quality and condition of each category are properly represented in the dataset. The end result is a training dataset that can be used to train the quality and condition model. In some embodiments, the dataset can be divided (e.g., no overlaps) into a training dataset and a validation dataset. Each property in the training dataset will presumably have an actual quality and condition rating as well as relevant listings and appraisal reports from which features can be extracted and used to estimate quality and condition.

As the size of the training data grows, the accuracy of the quality and condition model in estimating the quality and condition of a property based on appraisal and MLS data should improve. In some embodiments, the quality and condition model may utilize a recurrent neural network (RNN) algorithm, which may outperform other algorithms as the training data grows.

Figure 6:
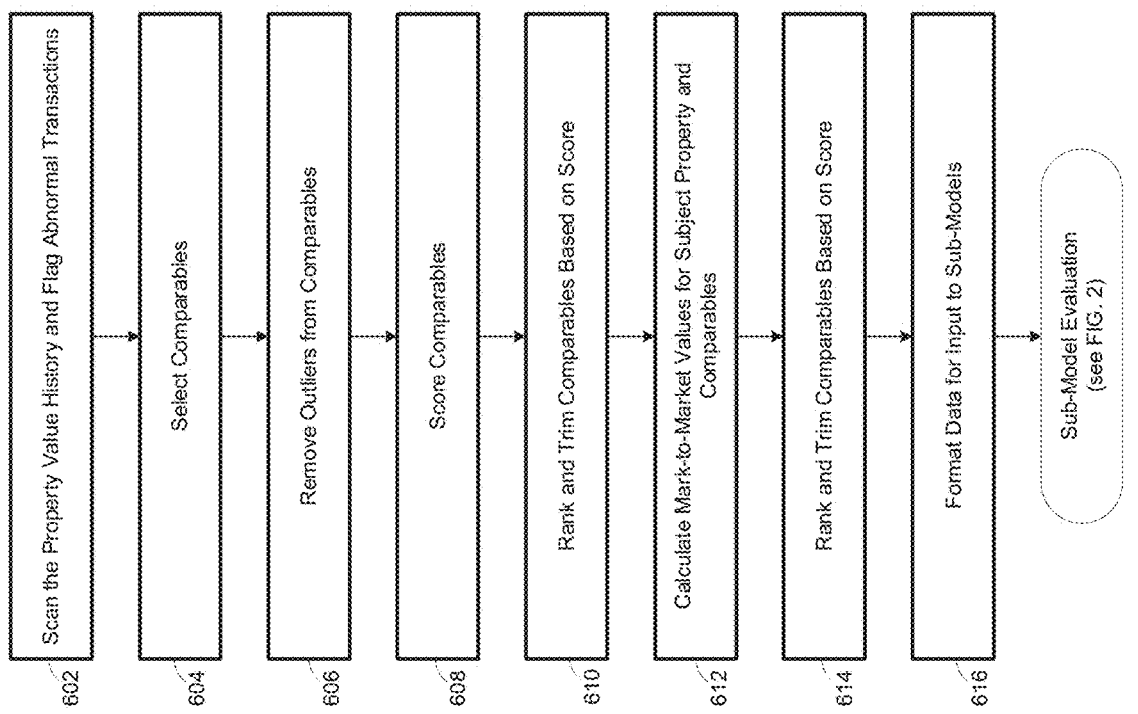
FIG. 6 is a flow chart that illustrates the model data preparation workflow used to further prepare the input data for the sub-models, in accordance with embodiments of the present disclosure.

FIG. 6 is a flow chart that illustrates the model data preparation workflow used to further prepare the input data for the sub-models. Cleaning up the input data for the sub-models is valuable because better input data results in better trained sub-models and better predictive results generated by the sub-models. Thus, the various techniques (including the specific combination and/or order) used to improve the quality of data input into the sub-models is very important from a processing standpoint.

At block 602, the system may scan the property value history and flag any abnormal transactions. For instance, if the property value history includes a transaction for a very low value, some explanations could be that the data was entered incorrectly or maybe the transaction was a sale to a relative of the owner. In those cases, that transaction should not be used in estimating the current value of the property and the system would remove it from the property value history.

At block 604, the system may identify and select comparables for the property (e.g., recently sold properties that are similar to the property based on the location, size, condition, and other features of the property). In some embodiments, the system may take a machine learning approach for identifying and selecting comparables for a property, which may take into account many different building features (e.g., square feet, lot size, age, rooms, bedrooms, bathrooms, number of stories, building style) and location features (e.g., tract, block, division, street address, distance between the properties, zip code, etc.) of the subject property and the comparable.

At block 606, the system may remove any outliers from the selected comparables. For instance, a comparable may be in similar in features to the subject property but historically it sold for a very different value for an atypical reason (e.g., the comparable is custom built and owned by a celebrity). These kinds of comparables are outliers and they should not be used in estimating the current value of the property so they are removed from consideration.

At block 608, a score ("comp score") may be generated for each of the remaining comparables that represents the degree of similarity between the subject property and comparable or how reliable that comparable would be for the purpose of estimating the subject property value. This may take into account the difference between the prices of the comparable and subject property (e.g., their mark-to-market values) and/or the differences between the comparable and subject property in terms of various building features (e.g., square feet, lot size, age, rooms, bedrooms, bathrooms, number of stories, building style) and location features (e.g., tract, block, division, street address, distance, zip code, etc.). For instance, a neighboring property with nearly similar features and mark-to-market value would be expected to have a high comp score. In some embodiments, there may be a complex set of rules for evaluating the various different features of the comparable and the subject property and generating the comp score.

At block 610, the system may rank and trim the comparables based on their corresponding comp score. In some embodiments, the system may utilize a gradient boosted trees algorithm to score the degree of similarity between the subject property and each comparable and then rank the comparables based on the scores, which will reveal the comparables with the highest degree of similarity to the subject property.

At block 612, the system may calculate mark-to-market values for the subject property and all the comparables that remain after block 610 using a home price index (HPI) and/or the Case-Shiller index. These indices may inform of price changes for homes in a particular geographic area over a period of time (e.g., month to month, year to year, etc.). In some cases, indices on a granular level may be available (e.g., for the homes in a particular zip code). Using these indices and the value of the subject property (or comparable) at a historic point in time, a mark-to-market value can be calculated (e.g., estimated current value) based on the assumption that the subject property has changed in value in-line with the rest of the properties in its local housing market over time.

At block 614, the system may again rank and trim the remaining comparables based on their corresponding comp score. In some embodiments, the system may also factor in the calculated mark-to-market values of the subject property and comparable. At block 616, the system may format the data (e.g., the calculated mark-to-market values for the subject property, the calculated mark-to-market values and comp scores for comparables that made the cut, etc.) to be used as inputs in evaluating the sub-models. The data may also include the attributes or features of the subject property, the attributes or features of the comparables, the property value of the comparables, and so forth.

Property Value Estimation

Figure 7A:
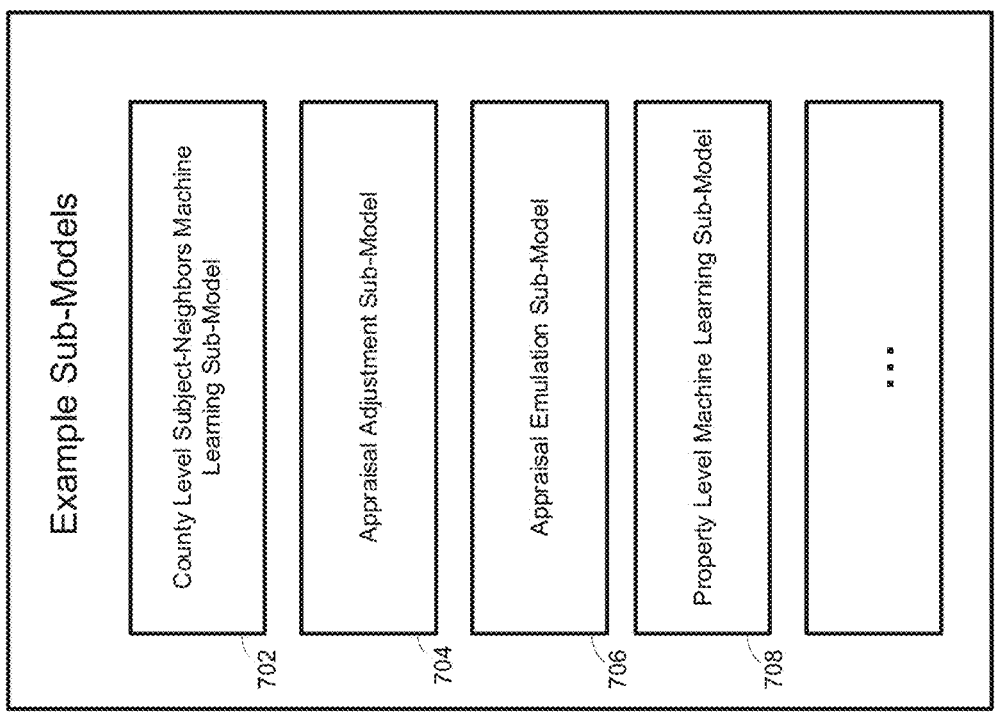
FIG. 7A is a block diagram illustrating some example sub-models that can be applied prior to the ensemble model, in accordance with embodiments of the present disclosure.

FIG. 7A is a block diagram illustrating some example sub-models that can be applied prior to the ensemble model. FIG. 7A and its example sub-models are best understood with context provided by FIGS. 7B-7E, which are flow diagrams that illustrate the workflow associated with the respective sub-models. In some embodiments, all of these example sub-models may be used in conjunction with an ensemble model. However, it should be understood that additional, not depicted sub-models could be employed as well, and that varying combinations of sub-models may be used.

As a general matter, all of the example sub-models shown in FIG. 7A are comparables-based, which mean that they aim to estimate a property value based on the features associated with one or more comparables (e.g., properties similar to the subject property), such as by adjusting known sale prices of the comparables in order to determine the value of the subject property. However, these example sub-models may have different approaches for making the estimation, which can include differences in the inputs they use and differences in how they select comparables for a particular subject property. In some embodiments, each of the example sub-models may have their own approach for scoring and selecting comparables. Some of the sub-models may be applied by having the sub-model select comps for a subject property, train a model on the comps on-the-fly, and then use that trained model to value the subject property.

As a result of these differences, each sub-model may have its own different strengths and weaknesses. For instance, property density can vary from urban to rural locations and a particular sub-model may be better at factoring in that variation into its estimate of subject property value. However, instead of selecting a single sub-model to use to evaluate a particular subject property, all the sub-models may be used to evaluate a subject property and their results can be combined using an ensemble model. The property valuation workflow described herein follows this approach, which is intended to harness the collective power of different techniques that each have their own strengths and weaknesses.

With respect to sub-model 702, sub-model 702 may be a county level subject-neighbors machine learning sub-model that leverages a combination of machine learning techniques and subject-neighbor relationships existing at the county level in order to first select the best comparables for a particular subject property before using those comparables to estimate subject property price. More specifically, the sub-model 702 may take advantage of the relationships that exist between similar properties within an entire county (e.g., the common or generalized relationships between pairs of properties in a county, based on the differences between their respective property attributes). A trained machine learning model can be used to determine which property attributes are most-relevant and informative of these relationships, and it can be used to select, for a subject property located in that county, the best comparables to that subject property (e.g., from among a list of comparables). Those selected comparables can then be used to train a predictive machine learning model for the subject property on-the-fly, which will model the relationships between property attributes and price among the subject property's best comparables. These relationships can then be applied to the subject property's attributes in order to estimate a value for the subject property. Thus, this approach is different from traditional automated valuation models which may model the relationships between property attributes and price at the property level (e.g., by comparing the respective property attributes and prices of the subject to comps in the neighborhood) and are constrained by the subject neighborhood.

In some embodiments, the sub-model 702 may be able to use separate models for home price index (HPI) and the Case-Shiller index values (e.g., for comp price). In some embodiments, the sub-model 702 may include a highly efficient light gradient boosting algorithm that is able to leverage the quality and condition scores mined from MLS texts or estimated by the quality and condition model.

Figure 7B:
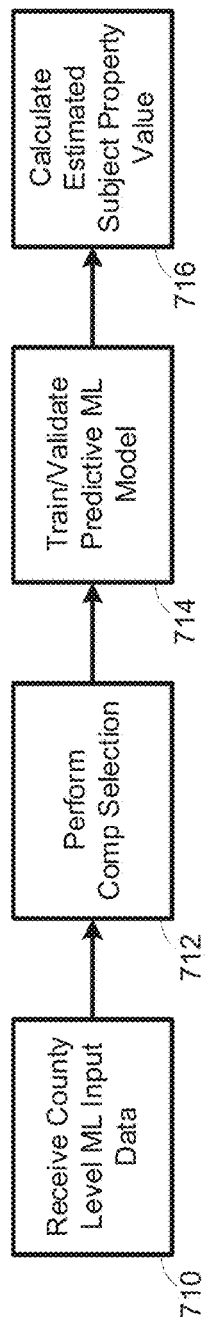
FIGS. 7B-7E include flow diagrams that illustrate the operation of the respective example sub-models shown in FIG. 7A, in accordance with embodiments of the present disclosure.

Sub-model 702 is better understood with context provided by FIG. 7B, which is a flow diagram illustrating a workflow associated with sub-model 702.

At block 710, the sub-model 702 may receive county level machine learning input data for the purpose of training the sub-model 702. The training data may contain input data for subject-comp pairings associated with properties in a particular county. For example, for every property in the county, that property may be treated as the subject property and compared to ten comparables, and input data associated with all ten of the subject-comp pairings for each property in the county may be included in the training data. The training data may look like the example data frame 718, which roughly shows an example of how the available input data for a handful of subject-comp pairings could be organized (the example data frame 718 only shows three subject-comp pairings for each of three properties). The input data for a subject-comp pairing may include the subject property attributes, the comp attributes, and the sale price of the comp. Accordingly, from this training data, the sub-model 702 could learn the relationships between subject and comps in a county in addition to the relationships between property attributes and value.

This allows the sub-model 702 to train a machine learning model for selecting the best comps associated with a particular subject property. For instance, the machine learning model may be trained and applied to select the comps for a subject property that have the greatest similarity or least difference. The difference between a subject and a comp can be modeled as a function of the subject property attributes and comp attributes. A machine learning technique such as automatic feature selection can be to figure out what features in the input data are the best ones to use (e.g., the subject attributes, comp price, comp attributes that are the most informative of this relationship) since the optimal features may be different for a larger county or a smaller county (e.g., county dependent). The sub-model 702 may also make a determination of the correlation for each subject-comp pairing based on their respective property attributes. Since the ML input data is county level data, a different comp selection machine learning model may have to be trained for each county. Validation may be performed with training.

At block 712, the sub-model 702 may select the trained comp selection model for the county that a particular subject property is located in, and then apply that trained comp selection model to the subject property in order select to the best comps associated with that subject property from a list of comparables (e.g., based on the respective property attributes of the subject and comps).

At block 714, the sub-model 702 may train and validate a predictive machine learning model for the subject property on-the-fly, which will model the relationships between property attributes and price among the subject property's best comparables. These relationships and the correlations between comp price and comp attributes can then be applied to the subject property's attributes at block 716 in order to estimate a value for the subject property.

In some embodiments, the data used with the sub-model 702 may be divided into two separate time periods in order to produce a training dataset and a validation dataset. For instance, if property valuation data is available for February 2017 to August 2019, then property valuation data for transactions between February 2017 and February 2019 can be used as the training dataset (e.g., ground truth) for training aspects of the sub-model 702. The out-of-sample property valuation data for transactions between February 2019 and August 2019 can be used as the validation dataset to determine how accurate the estimates are from the trained model.

Turning back to FIG. 7A, sub-model 704 may be an appraisal adjustment regression sub-model 704. In some embodiments, the sub-model 704 may be able to use separate models for home price index (HPI) and the Case-Shiller index values (e.g., for comp price). In some embodiments, the sub-model 704 may include a light gradient boosting algorithm that is able to leverage the quality and condition scores mined from MLS texts or estimated by the quality and condition model.

The appraisal adjustment regression sub-model 704 may be similar to the county level subject-neighbors machine learning sub-model 702 in some respects. For example, sub-model 704 may also be able to leverage a combination of machine learning techniques and subject-neighbor relationships existing at the county level in order to first select the best comparables for a particular subject property before using those comparables to estimate subject property price. More specifically, the sub-model 704 may take advantage of the relationships that exist between similar properties within an entire county in order to select the best comparables to a subject property from among a list of comparables. Those selected comparables can then be used to train regression models for the subject property on-the-fly, which will model the relationships between price and property attributes for each subject-comp pairing. These relationships can then be applied to the subject property's attributes in order to estimate a value for the subject property.

Figure 7C:
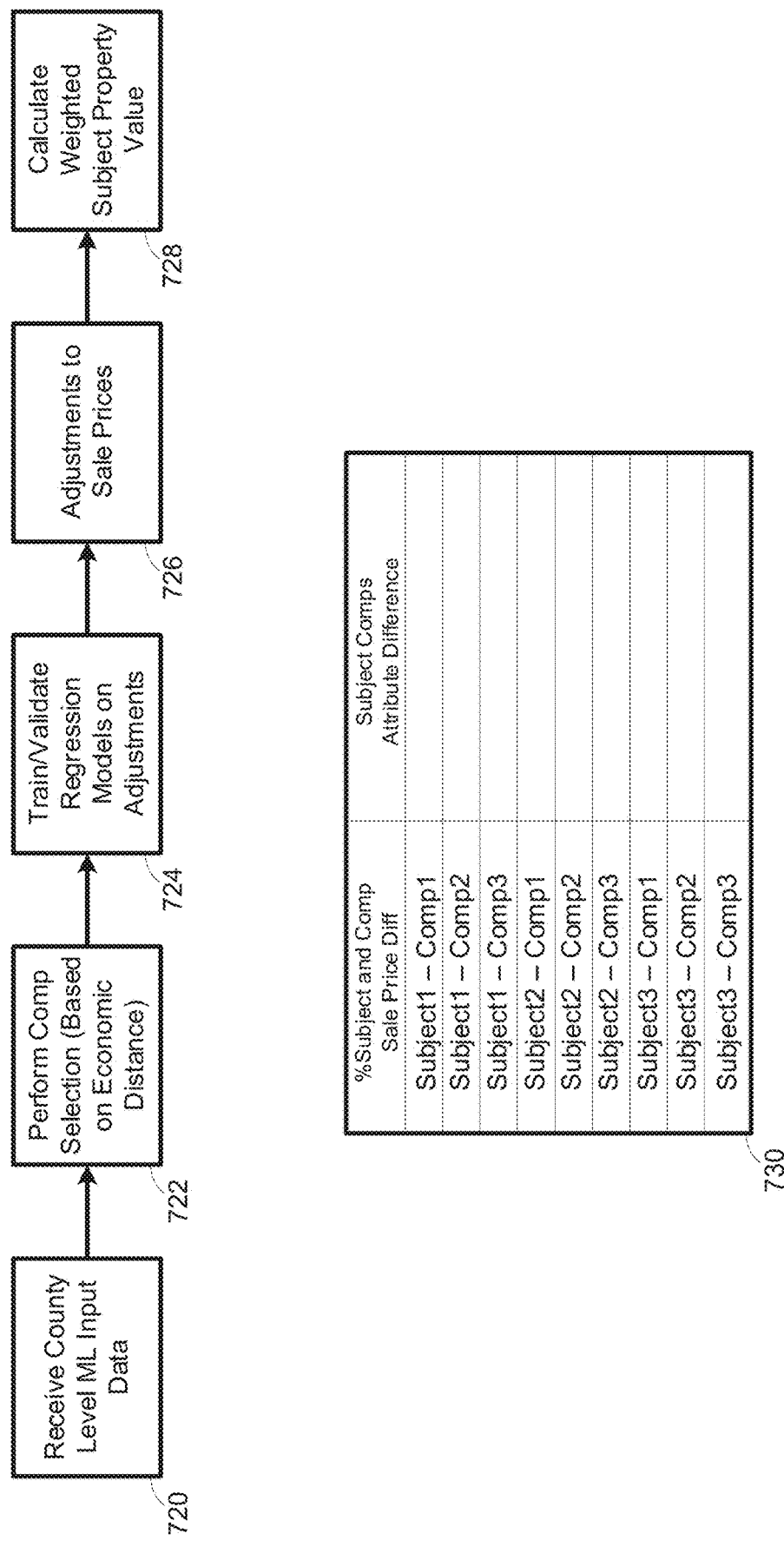

Sub-model 704 is better understood with context provided by FIG. 7C, which is a flow diagram illustrating a workflow associated with sub-model 704.

At block 722, the sub-model 704 may receive county level machine learning input data for the purpose of training the sub-model 704. The training data provided to the sub-model 704 may be similar to the training data provided to sub-model 702, except that the sub-model 704 may overall utilize less property attributes as its features. The training data may contain input data for subject-comp pairings associated with properties in a particular county. For example, for every property in the county, that property may be treated as the subject property and compared to ten comparables, and input data associated with all ten of the subject-comp pairings for each property in the county may be included in the training data. The training data may look like the example data frame 730, which roughly shows an example of how the available input data for a handful of subject-comp pairings could be organized (the example data frame 730 only shows three subject-comp pairings for each of three properties). The input data for a subject-comp pairing may include the difference between the subject sale price and the comp sale price (in percentage terms), the differences in various attributes of the subject and comp, and more. Accordingly, from this training data, the sub-model 704 could learn the relationships between subject and comps in a county in addition to the relationships between property attributes and value.

This allows the sub-model 704 to train a machine learning model for selecting the best comps associated with a particular subject property based on an economic distance metric. For instance, the machine learning model may be trained and applied to select the subject-comp pairings for a subject property that have the lowest economic distances. A machine learning technique such as automatic feature selection can be to figure out what features in the input data are the best ones use for calculating the economic distance for any subject-comp pairing. In some embodiments, the economic distance between a subject property and comp may not be purely based on differences between attributes of the subject property and comparable. For example, smaller differences between the subject sale price and the comp sale price (in percentage terms) could result in lower economic distances. The sub-model 704 may make a determination of the correlation for each subject-comp pairing based on the respective property attributes of the subject and comp. Since the ML input data is county level data, a different comp selection machine learning model may have to be trained for each county. Validation may be performed with training.

At block 722, the sub-model 704 may select the trained comp selection model for the county that a particular subject property is located in, and then apply that trained comp selection model to the subject property in order to select the best comps associated with a particular subject property (e.g., the properties most similar to the subject property) based on economic distance. The subject property can then be modeled against these selected comparables at block 724 in order to determine relationships between property attributes and value.

More specifically, at block 724, the sub-model 704 may train regression models based on the adjustments (e.g., the difference in price between the subject property and comparable) and the subject-comp attribute differences that are associated with the selected comps for the subject property. The sub-model 704 may make a determination of correlations between the adjustments and subject-comp attribute differences, which can be used and applied back to the subject property.

At block 726, the sub-model 704 may apply the regression models to input data associated with the subject property and its best comparables in order to calculate a set of adjustments to sale prices. For example, a regression model may understand that the subject property has a particular set of additional features over the comparable, and that for these differences in features there should be an additional price of ten thousand dollars considering the correlation between the subject property and the comparable. Thus, in this instance, the model may estimate that the sale price of the comparable may need to be adjusted upwards by ten thousand in order to obtain an estimate of subject property value. For each subject-comp pairing, there may be an adjustment calculated that can be used to adjust the sale price of the comparable in order to obtain an estimate of the subject property value.

At block 728, the sub-model 704 may combine the adjustments calculated for each subject-comp pairing into a single estimate for the subject property value. For example, for each subject-comp pairing, the calculated adjustment can be used to modify the sale price of the comp and obtain an estimate for subject property value. The estimated subject property values for all the subject-comp pairings can then be combined into a single estimate, such as by calculating a weighted average of all the estimated subject property values. In some embodiments, the weights may be derived from the economic distance for the respective subject-comp pairing and/or derived from a measure of the similarity for the respective subject-comp pairing (e.g., the correlation between the subject and comp).

Turning back to FIG. 7A, sub-model 706 may be an appraisal emulation sub-model that mimics the appraisal process, which generally involves identifying a handful of comparable properties, calculating adjustments associated with relevant attributes using the comps, and then adjusting the comp sale prices to take into account the difference in attributes between the subject and the comps (e.g., add or subtract adjustments to account for positive or negative features of the subject property).

Figure 7D:
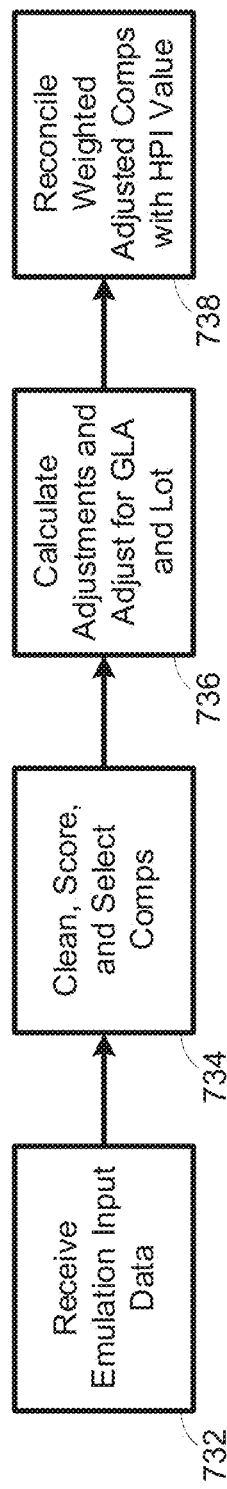

Sub-model 706 is better understood with context provided by FIG. 7D, which is a flow diagram illustrating a workflow associated with sub-model 706.

At block 732, the sub-model 706 may receive emulation input data, which includes input data associated with a subject property (e.g., subject attributes) and a number of potential comparable properties (e.g., comp attributes, comp price) to the subject property.

At block 734, the sub-model 706 may use an algorithm to score, rank and select the best three or four comps for a subject property.

At block 736, the sub-model 706 may calculate unit adjustments for various attributes (e.g. the amount of adjustment is $50 per square foot), which may be determined from the input data for the comps. The sub-model 706 may then calculate adjustments to be applied to each comp to account for differences in attributes between the subject and comp (e.g., add or subtract adjustments to account for positive or negative features) and adjust the sale price of the comp accordingly based on these adjustments in order to obtain an adjusted comp price showing what the subject is worth based on the comparable.

For example, properties with higher gross living area (GLA) may have a higher price and the sub-model 706 may determine from the comps that the unit adjustment for gross living area (GLA) is $50 per square foot. If one of the comps had 2,500 square feet in GLA while the subject property has 3,000 square feet in GLA, the value of the comp should be adjusted up by 500 square feet to make it 'equivalent' to the subject property, resulting in an adjustment of $25,000 ($50×500) to be added to the adjusted comp price.

At block 738, the sub-model 708 may reconcile each adjusted comp price with the home price index (HPI), which provides a measure of the average home price over time in a specific geographical area. The comp prices in the emulation input data are associated with sales that happened at different times (e.g., the sale price of comp 'A' may have occurred many years ago). In order to compensate for this time dimension, the adjusted comp prices may be reconciled with the HPI in order to bring the adjusted comp prices up-to-date and account for any changes in home prices that have occurred since the comp was sold. The adjusted comp prices can then be combined into a single estimate of subject property value, such as by calculating a weighted average of the adjusted comp prices. The weights can be proportional to the degree of similarity between the subject and comps (e.g., the comp requiring the lowest gross adjustment percentage may have the highest weighting).

Turning back to FIG. 7A, sub-model 708 may be a property level machine learning sub-model in which comparables to the subject property are presented and selected. Multiple models utilizing different techniques (e.g., machine learning, regression) can then be trained on-the-fly in order to model the relationships between the subject property and those selected comparables. Each model may then be applied to the attributes of the subject property in order to generate separate estimates of subject property value that can be reconciled into a single estimate.

Figure 7E:
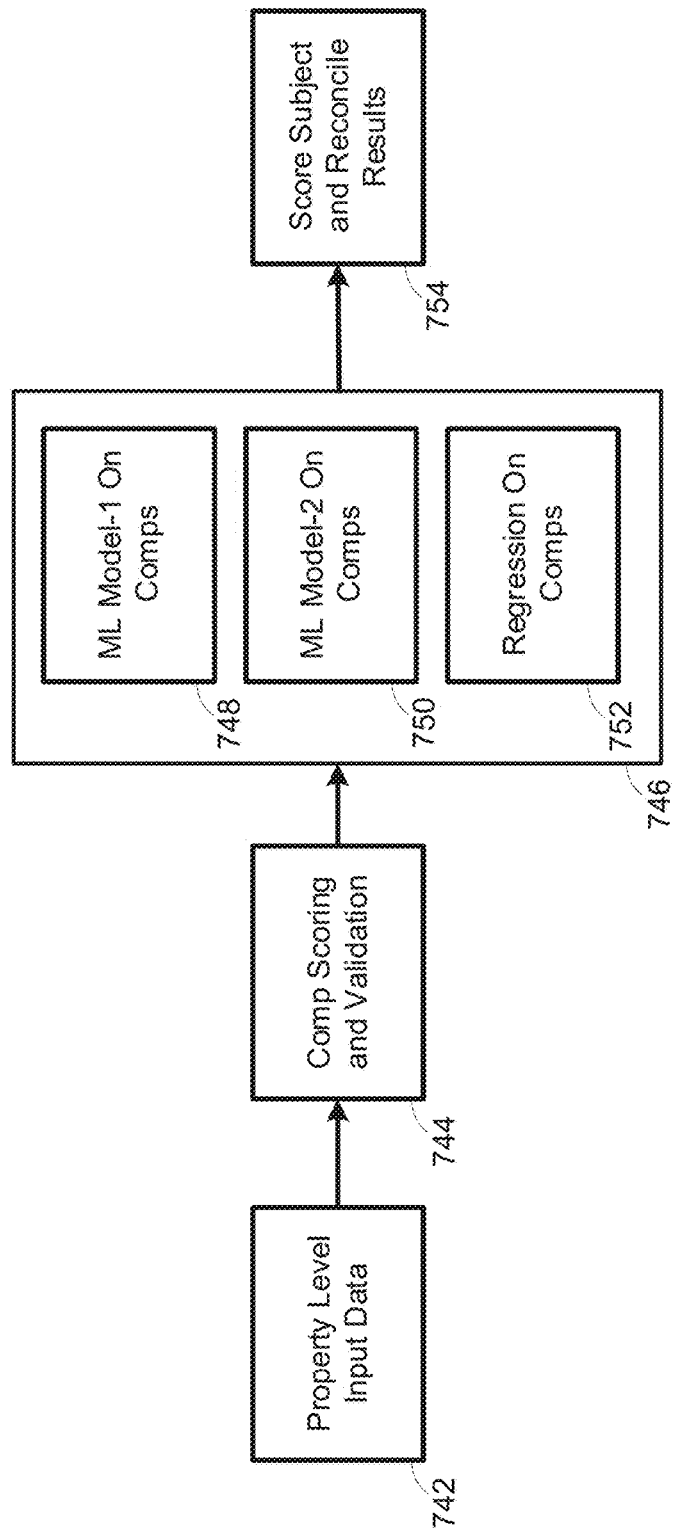

Sub-model 708 is better understood with context provided by FIG. 7E, which is a flow diagram illustrating a workflow associated with sub-model 708.

At block 742, the sub-model 708 may receive property level input data which includes input data associated with a subject property (e.g., subject attributes) and a number of potential comparable properties (e.g., comp attributes, comp price) for the subject property. For example, input data associated with the subject property could be provided along with input data for 200 comparable properties.

At block 744, the sub-model 708 may perform comp scoring and validation in order to select what it considers to be the best comparables. In some embodiments, the algorithm used to select comparables may include a radius search (e.g., comparables within a certain proximity to the subject property).

At block 746, the sub-model 708 may train multiple models on-the-fly that utilize different techniques in order to model the relationships between the subject property and those selected comparables (e.g., how differences in attributes result in differences in price). For example, in some embodiments, the sub-model 708 may train a machine learning model 748 utilizing gradient boosting, a machine learning model 750 utilizing random forest, and a regression model 752 based on the selected comps.

At block 754, the sub-model 708 may apply these multiple models to the attributes of the subject property in order to generate separate estimates of subject property value. These results may then be reconciled into a single estimate (e.g., using a technique such as averaging, weighted averaging, etc.)

Figure 8:
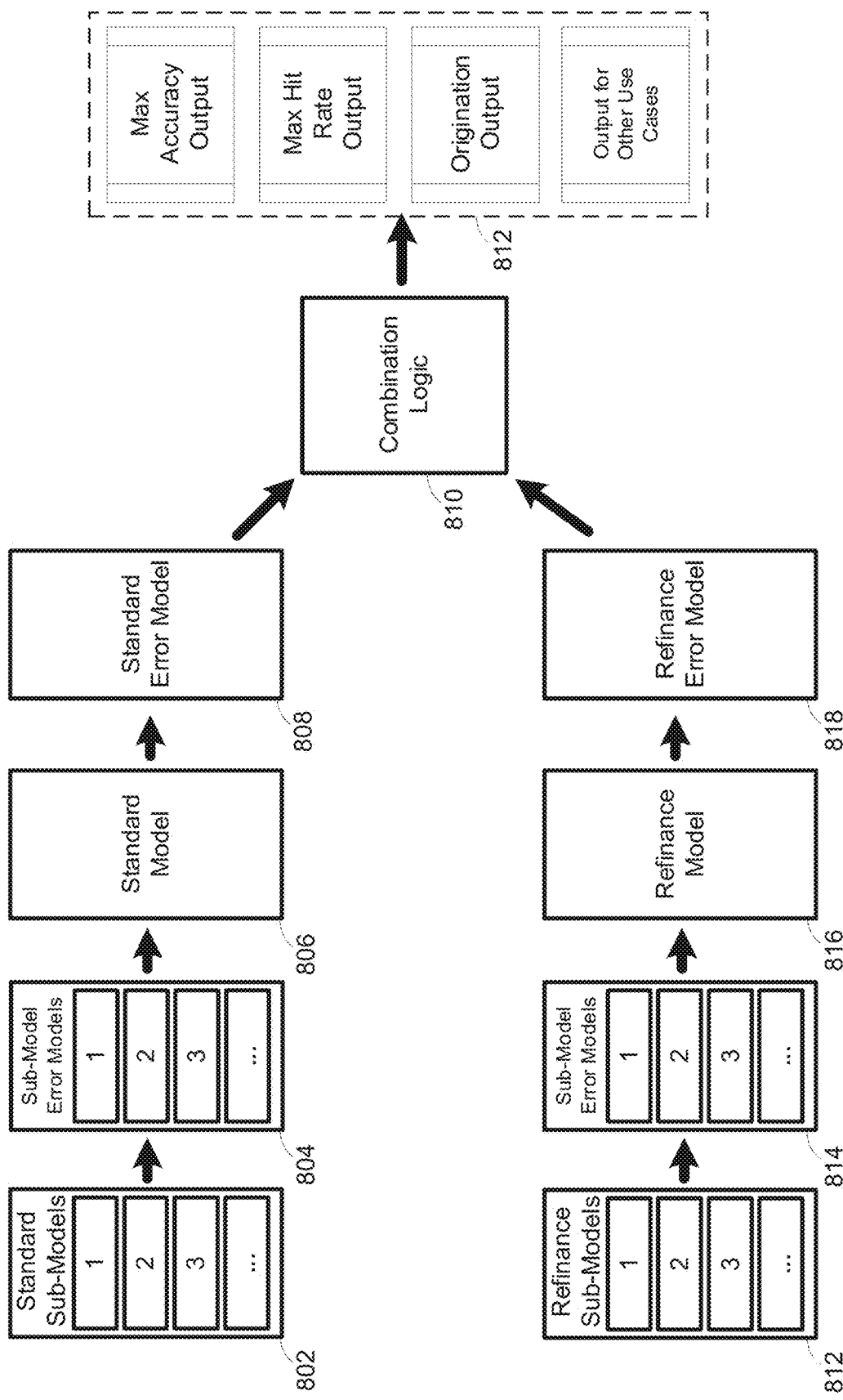
FIG. 8 is a flow diagram illustrating an example ensemble model workflow, in accordance with embodiments of the present disclosure.

FIG. 8 is a flow diagram illustrating an ensemble model workflow.

In some embodiments, there may be a set of standard sub-models 802 (such as the example sub-models shown in FIG. 7A), and each of the standard sub-models 802 may separately evaluate input data associated with the subject property in order to generate a predicted value for the subject property (e.g., based on comparables). For instance, if there are four sub-models in the set of standard sub-models 802, then four predicted values for the subject property would be generated. These four sub-models could generate estimated subject property values using approaches such as the ones described for the example sub-models of FIG. 7A.

The input data used by each of the sub-models 802 in generating their predictions may then be used as inputs in a set of standard sub-model error models 804 that correspond to those sub-models 802 and are configured to predict error based on the input data used by the sub-models 802. Each of the standard sub-model error models 804 may be tailored for a corresponding sub-model and trained on training data associated with that underlying sub-model. For instance, a first sub-model may be applied to a first set of input data to generate an estimate of property value. There may be an error model for this first sub-model that is trained to predict the error that would be associated with this estimated property value if provided with first set of input data that the first sub-model used to make the estimation. Accordingly, the set of standard sub-model error models 804 may be used to generate a predicted error (e.g., outlier scores/FSD) for each of the output values generated by the sub-models 802.

A standard ensemble model 806 may be applied to the estimated property values generated by the sub-models 802 and their corresponding predicted errors in order to generate a final property value. In some embodiments, the standard ensemble model 806 may generate this final property value by applying weights to the estimated property values generated by the sub-models 802 and their corresponding predicted errors generated by the sub-model error models 804. In some embodiments, there may be different sets of weights for different use cases and the set of weights applied by the standard ensemble model 806 may be based on the selected use case.

The input data that was used by the standard model 806 to generate the final property value can then be used as inputs in a standard error model 808 that is configured to predict the error associated with a final property value generated by the standard model 806. The standard error model 808 may have weights that are applied to the input data used by the standard model 806 in order to output a predicted error (e.g., outlier scores/FSD) associated with the final property value estimate.

In some embodiments, there may be a set of refinance sub-models 812 and each of the refinance sub-models 812 may separately evaluate input data associated with the subject property in order to generate a predicted value for the subject property (e.g., based on comparables). These sub-models 812 may also use the approaches such as the ones described for the example sub-models of FIG. 7A. In some embodiments, the difference between the refinance sub-models 812 and the standard sub-models 812 may be in the weights used. The refinance sub-models 812 may be configured to provide a higher accuracy in their outputs at the expense of hit rate, which may be desirable in certain circumstances (e.g., like refinancing).

The input data used by each of the refinance sub-models 812 in generating their predictions may then be used as inputs in a set of refinance sub-model error models 104 that correspond to those refinance sub-models 812 and are configured to predict error based on the input data used by the refinance sub-models 812. Each of the refinance sub-model error models 814 may be tailored for a corresponding refinance sub-model and trained on training data associated with that underlying refinance sub-model. For instance, a first refinance sub-model may be applied to a first set of input data to generate an estimate of property value. There may be a refinance error model that is trained to predict the error that would be associated with this estimated property value if provided with first set of input data that the first refinance sub-model used to make the estimation. Accordingly, the set of refinance sub-model error models 814 may be used to generate a predicted error (e.g., outlier scores/FSD) for each of the output values generated by the refinance sub-models 812.

A refinance model 816 may be applied to the estimated property values generated by the refinance sub-models 812 and their corresponding predicted errors in order to generate a final property value. In some embodiments, the refinance model 816 may generate this final property value by applying weights to the estimated property values generated by the refinance sub-models 812 and their corresponding predicted errors generated by the refinance sub-model error models 814. In some embodiments, there may be different sets of weights for different use cases and the set of weights applied by the refinance model 816 may be based on the selected use case. In some embodiments, the difference between the refinance model 816 and the standard model 806 may be in the weights used. The refinance model 816 may be configured to provide a higher accuracy in their outputs at the expense of hit rate, which may be desirable in certain circumstances (e.g., like refinancing).

The input data that was used by the refinance model 816 to generate the final property value can then be used as inputs in a refinance error model 818 that is configured to predict the error associated with a final property value generated by the refinance ensemble model 816. The refinance error model 818 may have weights that are applied to the input data used by the refinance model 816 in order to output a predicted error (e.g., outlier scores/FSD) associated with the final property value estimate.

In some embodiments, only the standard set of models (e.g., standard sub-models 802, standard sub-model error models 804, standard model 806, and standard error model 808) may be used, resulting in a final estimate of the subject property value and the predicted error (e.g., outlier scores/FSD) associated with that estimate that can be reported back to the user requesting the evaluation of the subject property. In some embodiments, only the refinance models (e.g., refinance sub-models 812, refinance sub-model error models 814, refinance model 816, and refinance error model 818) may be used, resulting in a final estimate of the subject property value and the predicted error (e.g., outlier scores/FSD) associated with that estimate that can be reported back to the user requesting the evaluation of the subject property.

In some embodiments, both the standard set of models and the refinance set of models may be used. There may be a set of combination logic 810 or algorithm that combines the final estimate of the subject property value and its predicted error for the standard set of models with the final estimate of the subject property value and its predicted error for the refinance set of models. For instance, the combination logic 810 may include weights that are applied to the standard estimates and refinance estimates to obtain a single, unified prediction for the value of the subject property.

In some embodiments, the combination logic 810 applied may be different depending on the selected use case. Some examples of use cases may include max hit rate (e.g., for marketing purposes), max accuracy (e.g., for loan originations), a combination of accuracy and hit rate (there may be various combinations with different relative priorities between the two), consistency (e.g., changes in value are due to market changes), and so forth. Hit rate may be the percentage of properties can be evaluated by the model, since there may be cases where there is very low confidence in the estimated value generated by the ensemble model, or there may not be data for the property, etc. Generally, there may be trade off between hit rate and accuracy. In general, there may be a trade-off between hit rate and accuracy.

Thus, for example, if the select use case is for a max accuracy output, then the combination logic 810 and/or the other weights applied throughout the ensemble model workflow may be configured for generating a predicted property value that minimizes predicted error.

During the training process, the ensemble model may be configured to perform feature selection and also to determine, for a particular use case, the weights to use for the combination logic 810 and/or any of the other weights applied throughout the workflow (e.g., the weights applied to the sub-models in the standard model 806 or refinance model 816), such as by using a method such as backpropagation. For instance, there may be a machine learning algorithm that will iteratively determine the proper weights to apply to sub-models that will minimize the error for the predicted value generated by the ensemble model (e.g., standard model 806, refinance model 816).

Error and Outlier Detection

Figure 9:
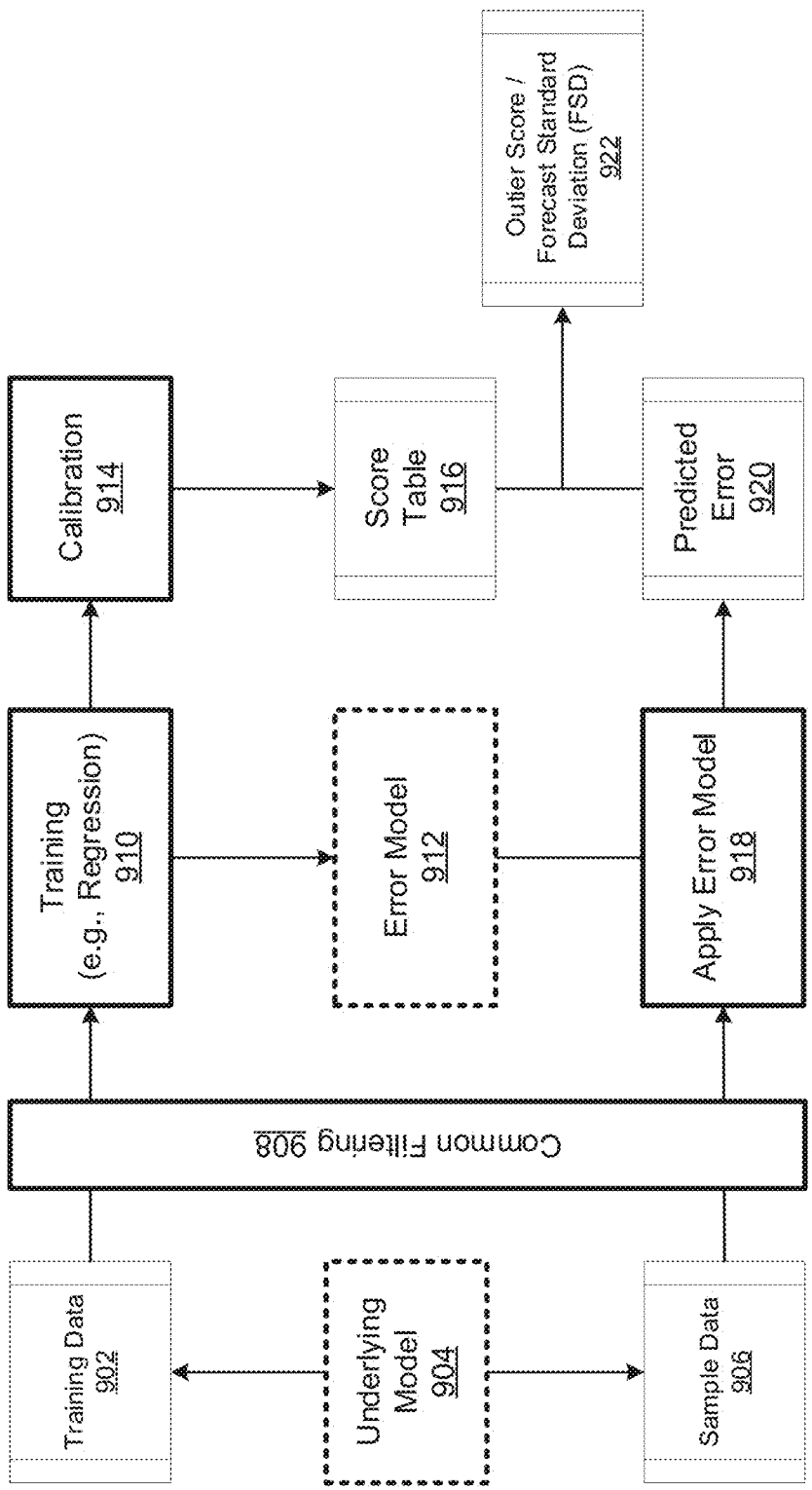
FIG. 9 is a flow diagram illustrating a workflow for training and applying error models, in accordance with embodiments of the present disclosure.

FIG. 9 is a flow diagram illustrating a workflow for training and applying error models.

The property valuation system may use many error models like error model 912 which are model dependent. More specifically, an error model 912 may be trained and tailored specifically for an underlying model 904 and predicting the error for the outputs generated by that underlying model 904.

The underlying model 904 may be a specific sub-model or an ensemble model, which aim to output an estimate for subject property value. If an actual sale value for the property is known then actual error can be determined based on how off the mark the estimate is. Thus, whenever the underlying model 904 generates an estimate of property value for a property for which the actual sale value is known, the estimated property value, actual sale value, and the input data used to generate the estimated property value can be saved into training data 902 (with the actual sale value serving as ground truth). The training data 902 may be processed, cleaned up, and properly formatted through a common filtering process at block 908 before being used to train an error model 912 at block 910 (e.g., using a machine learning algorithm).

In some embodiments, regression may be the technique used to train the error model 912 to understand the correlation between error (e.g., the differences between an actual sale value of the property and the estimated property value from the underlying model 904) and the features (e.g., the input data) used in the underlying model 904. The features may vary depending on the underlying model 904, and in some cases there may be a long list of features used by the underlying model 904 in prediction (e.g., attributes of the subject property, attributes of a comparable, etc.). Some features will contribute more in causing error, and training the error model 912 will reveal the weights (e.g., coefficients) for the features which inform which features used by the underlying model 904 in the prediction of property value contribute the most to error. The training process may enable calibration between various error values and confidence levels/outlier scores/forecast standard deviation (FSD), which can all be compiled to generate a score table 916 for mapping error values to confidence levels/outlier scores/FSD.

With the weights for the error model 912 determined, the error model 912 can be applied to a set of inputs used by the underlying model 904 in estimating a property's value in order to generate an error prediction even if the actual sale value is not known. For instance, during an evaluation request of a subject property, the underlying model 904 may generate an estimate of subject property value based on a set of input data associated with the subject property. The sample data 906, which includes this set of input data, may be processed, cleaned up, and properly formatted through a common filtering process at block 908 before the error model 912 is applied to it at block 918 in order to generate a predicted error 920. Afterwards, the score table 916 can be referenced in order to determine the outlier score/FSD for the predicted error 920.

It should be noted that the weights obtained from training the error model 912 are for the underlying model 904 and this error model 912 can only be used to calculate predicted error and determine its confidence level/outlier score/FSD for an output generated by that particular underlying model 904. Thus, a separate error model may need to be trained for each predictive model (e.g., each sub-model and/or ensemble model) used in the property valuation workflow. When this approach is used to determine the relationships between the error of the ensemble model and the features used in the ensemble model (which include the sub-model outputs), the determined weights may provide a correlation between error of the ensemble model and the sub-model outputs, which can be one approach for determining the weights to be applied to the sub-model outputs in the ensemble model for particular use cases.

Figure 10:
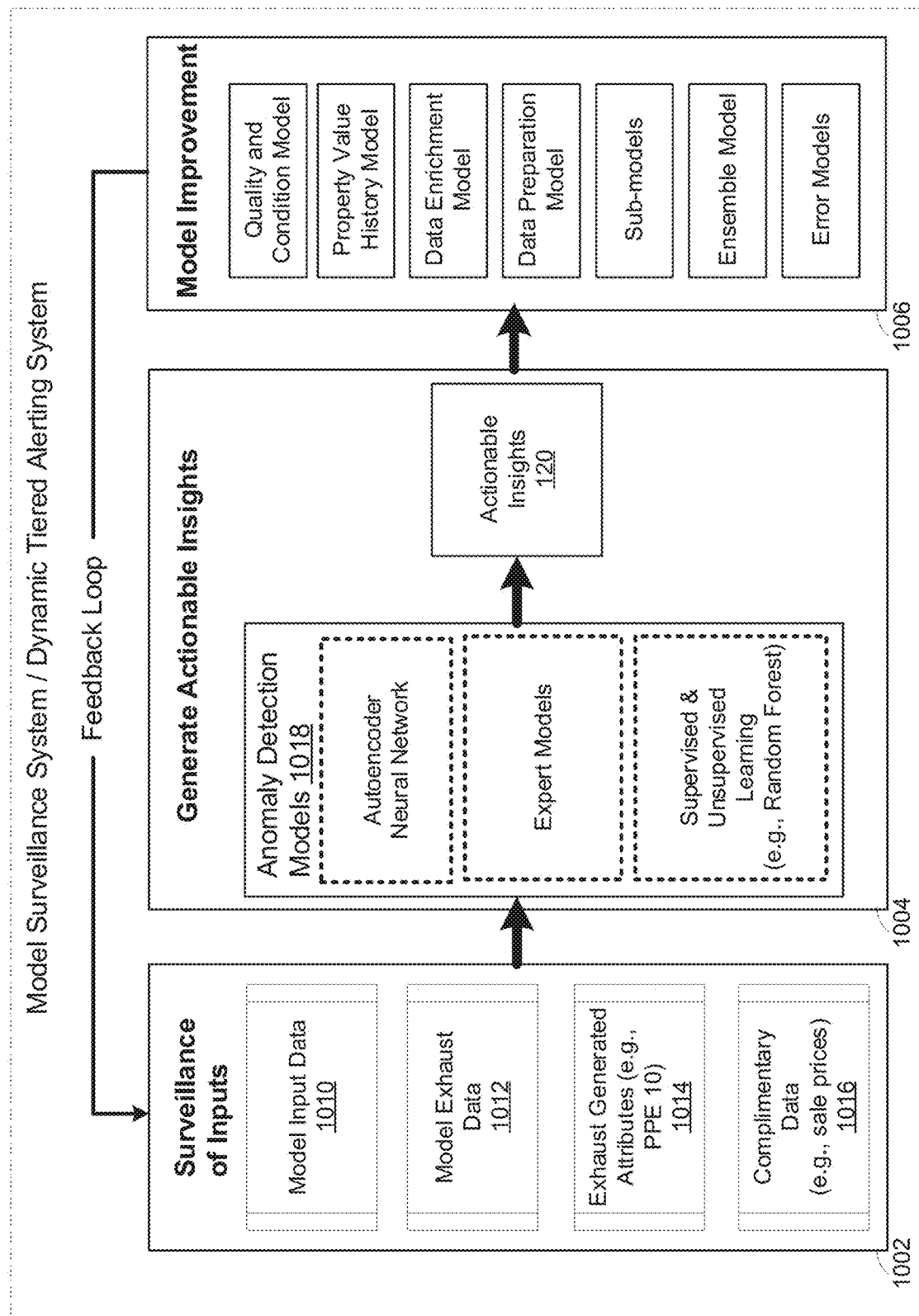
FIG. 10 is a flow diagram illustrating a workflow performed by a model surveillance system, in accordance with embodiments described herein.

FIG. 10 is a flow diagram illustrating a workflow performed by a model surveillance system or a dynamic tiered alerting system (the terms are interchangeable as used herein).

As a general overview, the model surveillance system may serve as an intelligent decision support system that includes an integrated set of anomaly detection methodologies, which can be used to detect anomalies in data and to provide feedback and insight for improving individual model performance and performance of the entire property valuation workflow. More specifically, the model surveillance system may be able to identify various kinds of anomalies, generate alerts based on the anomalies, perform triage and tiering of alerts based on impact (e.g., prioritize alerts for anomalies with greater impact), and provide feedback and insight for re-training and fine-tuning models to make them more accurate.

The model surveillance system may continuously be evaluating the performance of the individual models used in the property valuation workflow described herein. In order to do this, the model surveillance system may, for each model, take a comprehensive set of data associated with that model and use them as inputs to a set of anomaly detection models 1018 that are configured to identify anomalies associated with model performance. This comprehensive set of input data may be obtained from various sources, and some of the input data may be derivative of others. For example, at block 1002, for any particular model, the model surveillance system may surveil and collect a comprehensive set of data associated with application of that model over time, which may include model input data 1010 (e.g., the input data being fed into the model for a number of evaluations), model exhaust data 1012 which include values generated by the model that are helpful in identifying anomalies and determining their causes (e.g., the output and error generated by the model for a number of evaluations, values of attributes used as part of the model, etc.), exhaust generated attributes 1014 (e.g., attributes associated with the model exhaust data 1012, such as PPE 10—the percentage of model results that had a predicted error within 10%), and complimentary data 1016 (e.g., sale prices for any of the evaluations, if available).

At block 1004, the model surveillance system may apply one or more anomaly detection models 1018 to the comprehensive set of input data for each model for the purpose of generating actionable insights. The anomaly detection models 1018 may be configured to detect different anomalies associated with the performance of each model using various approaches and algorithms, including rules-based approaches and machine learning algorithms, such as auto-encoders, neural networks, expert models (e.g., rules-based models), supervised & unsupervised learning (e.g., random forest), and so forth. In some cases, rules can be used to catch data deficiencies and can be model independent and based on common sense (e.g., if a sales price is ten digits it is likely a data entry error). In some cases, machine learning approaches can be used to catch model deficiencies and can be model dependent (e.g., error models for obtaining confidence score and FSD). An anomaly may be detectable in any part of the comprehensive set of input data provided to the anomaly detection models 1018 (e.g., anomalies could be detected in the model input data 1010, model exhaust data 1012, exhaust generated attributes 1014, etc.)

The model surveillance system may use these multiple approaches to generate a profile for the performance of each model, assign priorities to them, and generate any potential actionable insights 1020 for improving that model.

At block 1006, the actionable insights 1020 for any of the models in the property valuation workflow may be evaluated and used to make improvements to those models. Thus, the outcomes from evaluating the performance of the models can be delivered back into the property valuation workflow by enhancing the models, which will further enhance any data sets associated with the models (such as the generated outputs in the model exhaust data 1012 for each model)—e.g., the data sets which are continuously surveilled at block 1002, at which point this surveillance workflow can repeat over again, thereby creating a continuous feedback loop.

This model surveillance system and its surveillance workflow provides numerous technical advantages and benefits. At the most basic level, the model surveillance system can be used to improve the performance of all the models in the property valuation workflow. However, the model surveillance system significantly improves the rate at which the models can be improved. For example, model improvement has traditionally been a very manual, one-way process in which a developer mainly focuses on downstream data by comparing the model's predictive output to a benchmark (e.g., known sale prices). The developer determines ways to improve the model (sometimes by trial and error and trying different combinations of adjustments to the model), and then informs the model of updates. Actual changes to the model are then made in a separate re-train process. In comparison, the model surveillance system is an ongoing, real-time system that constantly surveils model input and exhaust data to identify anomalies in the data, evaluates those anomalies for insights and suggestions to improve model performance, and is capable of immediately implementing those insights and suggestions to retrain the models on-the-fly for improved performance.

Additionally, the model surveillance system allows many data sources and types of data to be simultaneously monitored and evaluated, which results in a much more comprehensive identification of any anomalies and insights for model improvement. For example, a developer may primarily focus on a model's immediate downstream by comparing the model's predictive output to a benchmark because the amount of data involved throughout a property valuation workflow may be very large which makes it difficult to review all that data manually. In some cases, there may be an alerting system residing at the data source that serves to monitor the quality of the data coming from the data source. However, for the most part the upstream data to a model may be overlooked. In comparison, the model surveillance system or dynamic tiered alerting system is capable of monitoring and evaluating the upstream and downstream data (e.g., model input data 1010, model exhaust data 1012, exhaust generated attributes 1014 and statistics, complimentary data sources 1016, and so forth). In other words, instead of focusing on a single model or dataset, the model surveillance system views the property valuation workflow as a whole and is able to consider the relationships between different models and datasets.

As a result, the model surveillance system is able to detect anomalies and outliers that would be difficult and time-consuming to detect through other approaches. As an example, assume that appraisal data used in the model input data contains sale prices for some properties that were miss-keyed (e.g., mistakenly input) and are much larger than they should be, resulting in two sets of outliers associated with the data enrichment and preparation models (e.g., these models directed to data quality should have corrected these two outliers). In order to catch these outliers, it is not enough to look at model input data (e.g., provided to a sub-model) containing these two sets of sales price outliers because their impact on the model (and effect on the generated value prediction) would not be apparent from just looking at the input data.

However, by performing a comprehensive review of the model input data and model exhaust data in combination, the two sets of miss-keyed sale prices can be quickly identified as data errors that need to be resolved. For example, the model surveillance system may generate a scatterplot and plot for each property its model-predicted property value (on the Y-axis) against its sale price from the appraisal data (on the X-axis). Under the general assumption that the predicted property value should not deviate drastically from the sale price, all the properties should be clustered around the line y=x. However, the two sets of properties with the two sets of miss-keyed sale prices would not be clustered with the rest of the properties, and unsupervised learning methods could be used to identify these two sets of properties as outliers right away (e.g., by identifying the two clusters as separate from the main cluster). In comparison, any approach that would involve a manual review of the data may potentially take days to identify these two outliers. And this is just one outlier scenario—the model surveillance system could be constantly monitoring a countless number of different scenarios with its various anomaly detection models 1018.

In addition to being able to identify different outliers, another technical advantage of the model surveillance system is that it can also learn over time the underlying causes for different outliers, how the outliers that arise in different scenarios can be corrected, and how models may be adjusted to prevent those outliers from occurring. Any identified outlier can be presented to a developer to review to make a determination regarding whether it is actually an outlier and its cause. At first, feedback for every identified outlier would have to be obtained. However, over time as more and more feedback is obtained, all that feedback can be used with supervised learning to teach the system what is actually an outlier and why. Thus, a continuous feedback loop can be established where the model surveillance system is constantly learning what is an outlier and why, resulting in the model surveillance system continuously getting better and better at identifying outliers and their causes.

For instance, in the previous example involving identifying the two clusters of outliers, it would not be immediately understood by the system what caused the outliers and what to do with them. However, a developer could implement models to track down the possible causes for these outliers and use supervised learning to teach the system that outliers in this scenario are associated with certain characteristics in the data. The developer could also create a comprehensive profile for this specific outlier scenario with all the available knowledge about it (including from any associated models or anomaly detection models), such as: how the outliers for this scenario are detected, the causes of those outliers and their association to the property valuation workflow (e.g., should be corrected during data enrichment and preparation), the impact of these outliers and how they should be prioritized in generated alerts, how these outliers may be corrected, how models can be adjusted to prevent them, and so forth. Thus, if the model surveillance system identifies similar outliers that fit into this scenario, the model surveillance system may be able to reference the profile for the scenario and leverage the contained knowledge to inform a developer of the identified outliers and provide them with any insight or suggestions it may have (e.g., the cause of these outliers, how the outliers should be corrected, or how models can be adjusted to prevent these outliers). Alternatively, the model surveillance system may be able to automatically proceed on its own to correct these outliers or make adjustments/enhancements to the data enhancement and preparation models.

Example Hardware Configuration of Computing System

Figure 11:
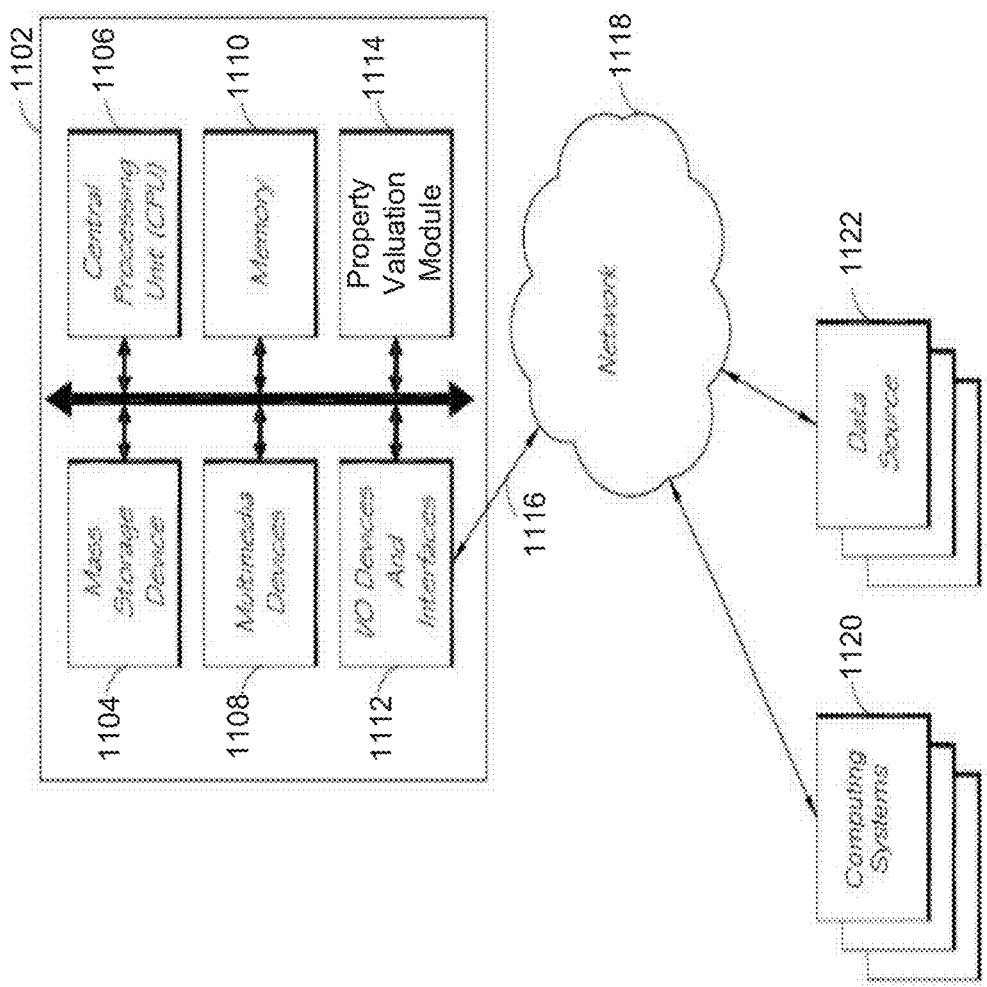
FIG. 11 is a block diagram of an example computing system.

FIG. 11 illustrates an embodiment of a hardware configuration for a computing system 1102 that can be used to implement the systems, processes, and methods described herein. For example, the illustrated embodiment of the computer system can be used for the property valuation system 100 described herein.

For instance, the example computer system 1102 is in communication with one or more computing systems 1120 and/or one or more data sources 1122 via one or more networks 1118. While FIG. 11 illustrates an embodiment of a computing system 1102, it is recognized that the functionality provided for in the components and modules of computer system 1102 may be combined into fewer components and modules, or further separated into additional components and modules.

The computer system 1102 can comprise a property valuation module 1114 that carries out the functions, methods, acts, and/or processes described herein. The property valuation module 1114 is executed on the computer system 1102 by a central processing unit 1106 discussed further below.

In general the word "module," as used herein, refers to logic embodied in hardware or firmware or to a collection of software instructions, having entry and exit points. Modules are written in a program language, such as JAVA, C or C++, PYTHON or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems, and may be stored on or within any suitable computer readable medium, or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 1102 includes one or more processing units (CPU) 1106, which may comprise a microprocessor. The computer system 1102 further includes a physical memory 1110, such as random access memory (RAM) for temporary storage of information, a read only memory (ROM) for permanent storage of information, and a mass storage device 1104, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 1102 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 1102 includes one or more input/output (I/O) devices and interfaces 1112, such as a keyboard, mouse, touch pad, and printer. The I/O devices and interfaces 1112 can include one or more display devices, such as a monitor, that allows the visual presentation of data to a participant. More particularly, a display device provides for the presentation of GUIs as application software data, and multi-media presentations, for example. The I/O devices and interfaces 1112 can also provide a communications interface to various external devices. The computer system 1102 may comprise one or more multi-media devices 1108, such as speakers, video cards, graphics accelerators, and microphones, for example.

The computer system 1102 may run on a variety of computing devices, such as a server, a Windows server, a Structure Query Language server, a Unix Server, a personal computer, a laptop computer, and so forth. In other embodiments, the computer system 1102 may run on a cluster computer system, a mainframe computer system and/or other computing system suitable for controlling and/or communicating with large databases, performing high volume transaction processing, and generating reports from large databases. The computing system 1102 is generally controlled and coordinated by an operating system software, such as z/OS, Windows, Linux, UNIX, BSD, SunOS, Solaris, MacOS, or other compatible operating systems, including proprietary operating systems. Operating systems control and schedule computer processes for execution, perform memory management, provide file system, networking, and I/O services, and provide a user interface, such as a graphical user interface (GUI), among other things.

The computer system 1102 illustrated in FIG. 11 is coupled to a network 1118, such as a LAN, WAN, or the Internet via a communication link 1116 (wired, wireless, or a combination thereof). Network 1118 communicates with various computing devices and/or other electronic devices. Network 1118 is communicating with one or more computing systems 620 and one or more data sources 1122. The property valuation module 1114 may access or may be accessed by computing systems 1120 and/or data sources 1122 through a web-enabled user access point. Connections may be a direct physical connection, a virtual connection, and other connection type. The web-enabled user access point may comprise a browser module that uses text, graphics, audio, video, and other media to present data and to allow interaction with data via the network 1118.

Access to the property valuation module 1114 of the computer system 1102 by computing systems 1120 and/or by data sources 1122 may be through a web-enabled user access point such as the computing systems 1120 or data source's 1122 personal computer, cellular phone, smartphone, laptop, tablet computer, e-reader device, audio player, or other device capable of connecting to the network 1118. Such a device may have a browser module that is implemented as a module that uses text, graphics, audio, video, and other media to present data and to allow interaction with data via the network 1118.

The output module may be implemented as a combination of an all-points addressable display such as a cathode ray tube (CRT), a liquid crystal display (LCD), a plasma display, or other types and/or combinations of displays. The output module may be implemented to communicate with input devices 1112 and they also include software with the appropriate interfaces which allow a user to access data through the use of stylized screen elements, such as menus, windows, dialogue boxes, toolbars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the computing system 1102 may comprise a physical or logical connection established between a remote microprocessor and a mainframe host computer for the express purpose of uploading, downloading, or viewing interactive data and databases on-line in real time. The remote microprocessor may be operated by an entity operating the computer system 1102, including the client server systems or the main server system, and/or may be operated by one or more of the data sources 1122 and/or one or more of the computing systems 1120. In some embodiments, terminal emulation software may be used on the microprocessor for participating in the micro-mainframe link.

In some embodiments, computing systems 1120 which are internal to an entity operating the computer system 1102 may access the property valuation module 1114 internally as an application or process run by the CPU 1106.

The computing system 1102 may include one or more internal and/or external data sources (for example, data sources 1122). In some embodiments, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 1102 may also access one or more databases 1122. The databases 1122 may be stored in a database or data repository. The computer system 1102 may access the one or more databases 1122 through a network 1118 or may directly access the database or data repository through I/O devices and interfaces 1112. The data repository storing the one or more databases 1122 may reside within the computer system 1102.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and the like, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
   obtaining model data input to a first machine learning model in a plurality of machine learning models used in a property valuation workflow or output from the first machine learning model;
   applying the model data as an input to at least one of a plurality of machine learning anomaly detection models, wherein the at least one of the plurality of machine learning anomaly detection models is different than the first machine learning model;
   detecting an anomaly in the model data applied as the input to the at least one of the plurality of machine learning anomaly detection models based on an output of the at least one of the plurality of machine learning anomaly detection models;
   generating a suggestion to modify at least some of the model data based on a profile associated with the detected anomaly, wherein the suggestion comprises an identification of the detected anomaly;
   presenting the suggestion to a user for review;
   modifying the at least some of the model data in accordance with the generated suggestion; and
   re-training the first machine learning model using the modified at least some of the model data.

2. The method of claim 1, wherein modifying the at least some of the model data associated with the execution of the first machine learning model further comprises modifying the at least some of the model data automatically without user intervention.

3. The method of claim 1, wherein re-training the first machine learning model improves performance of the first machine learning model.

4. The method of claim 3, wherein re-training the first machine learning model further comprises re-training the first machine learning model automatically without user intervention.

5. The method of claim 1, wherein the model data associated with execution of the first machine learning model comprises at least one of model input data, model exhaust data, exhaust generated attributes, or complimentary data.

6. The method of claim 1, wherein the profile associated with the detected anomaly includes a cause for the detected anomaly.

7. The method of claim 6, wherein the profile associated with the detected anomaly includes an approach for correcting or preventing the detected anomaly.

8. The method of claim 1, further comprising monitoring individual performance of the first machine learning model on a continual basis.

9. A system comprising:
   one or more computers; and
   computer storage media storing instructions that when executed by the one or more computers, cause the one or more computers to:
      obtain model data input to a first machine learning model in a plurality of machine learning models used in a property valuation workflow or output from the first machine learning model;
      apply the model data as an input to at least one of a plurality of machine learning anomaly detection models, wherein the at least one of the plurality of machine learning anomaly detection models is different than the first machine learning model;
      detect an anomaly in the model data applied as the input to the at least one of the plurality of machine learning anomaly detection models based on an output of the at least one of the plurality of machine learning anomaly detection models;
      generate a suggestion to modify at least some of the model data based on a profile associated with the detected anomaly, wherein the suggestion comprises an identification of the detected anomaly;
      present the suggestion to a user for review;
      modify the at least some of the model data in accordance with the generated suggestion; and
      re-train the first machine learning model using the modified at least some of the model data.

10. The system of claim 9, wherein the instructions, when executed, further cause the one or more computers to modify the at least some of the model data automatically without user intervention.

11. The system of claim 9, wherein the instructions, when executed, further cause the one or more computers to re-train the first machine learning model automatically without user intervention.

12. The system of claim 9, wherein the model data associated with execution of the first machine learning model comprises at least one of model input data, model exhaust data, exhaust generated attributes, or complimentary data.

13. The system of claim 9, wherein the profile associated with the detected anomaly includes a cause for the detected anomaly.

14. The system of claim 13, wherein the profile associated with the detected anomaly includes an approach for correcting or preventing the detected anomaly.

15. Non-transitory computer storage media storing instructions that when executed by a system of one or more computers, cause the one or more computers to perform operations comprising:

obtaining model data input to a first machine learning model in a plurality of machine learning models used in a property valuation workflow or output from the first machine learning model;

applying the model data as an input to at least one of a plurality of machine learning anomaly detection models, wherein the at least one of the plurality of machine learning anomaly detection models is different from the first machine learning model;

detecting an anomaly in the model data applied as the input to the at least one of the plurality of machine learning anomaly detection models based on an output of the at least one of the plurality of machine learning anomaly detection models;

generating a suggestion to modify at least some of the model data based on a profile associated with the detected anomaly, wherein the suggestion comprises an identification of the detected anomaly;

presenting the suggestion to a user for review;

modifying the at least some of the model data in accordance with the generated suggestion; and re-training the first machine learning model using the modified at least some of the model data.

16. The non-transitory computer storage media of claim 15, wherein the first machine learning model, a second machine learning model, and a third machine learning model comprise, at least in part, a plurality of sub-models and an ensemble model, and wherein the ensemble model is applied to outputs of the plurality of sub-models.

\* \* \* \* \*